(12) United States Patent
Akiya

(10) Patent No.: US 8,045,269 B2
(45) Date of Patent: Oct. 25, 2011

(54) OPTICAL FILTER

(75) Inventor: Shuji Akiya, Saitama (JP)

(73) Assignee: Fujinon Corporation, Saitama (JP)

(*) Notice: Subject to any disclaimer, the term of this patent is extended or adjusted under 35 U.S.C. 154(b) by 789 days.

(21) Appl. No.: 12/053,639

(22) Filed: Mar. 24, 2008

(65) Prior Publication Data

US 2008/0239496 A1 Oct. 2, 2008

(30) Foreign Application Priority Data

Mar. 27, 2007 (JP) ................................ 2007-081196

(51) Int. Cl.
*G02B 5/28* (2006.01)

(52) U.S. Cl. ........................................ 359/589; 359/582

(58) Field of Classification Search .................. 359/589, 359/582

See application file for complete search history.

(56) References Cited

U.S. PATENT DOCUMENTS

| | | | | |
|---|---|---|---|---|
| 5,400,174 A * | 3/1995 | Pagis et al. | ..................... | 359/359 |
| 7,564,628 B2 * | 7/2009 | Barth et al. | ..................... | 359/582 |
| 2002/0071075 A1 * | 6/2002 | Ogino et al. | .................. | 349/113 |
| 2003/0002157 A1 * | 1/2003 | Someno | ........................ | 359/586 |

FOREIGN PATENT DOCUMENTS

JP 2002-333519 11/2002

OTHER PUBLICATIONS

"Thin-Film Optical Filters", H. A. Macleod, B.Sc., A.Inst.P., Instrument Development Manager, Adam Hilger Ltd: London, pp. 116-117, 1969.

* cited by examiner

*Primary Examiner* — Joshua L Pritchett

(74) *Attorney, Agent, or Firm* — Birch, Stewart, Kolasch & Birch, LLP

(57) ABSTRACT

An optical filter has a multilayer thin film comprising first to i-th layers stacked in alternate layers of high and low refractive indices on a transparent substrate. Respective odd-numbered layers (high refractive index layers) and respective even-numbered layers (low refractive index layers) form repetitive sequences of layers each of which cyclically changes in optical thickness throughout the multilayer thin film. Each of k-th from-the-bottom alternate layers of high and low refractive indices has such an optical thicknesses as meet the following conditional expressions (1) and (2), concurrently:

$$n \times d = (.c/4) \times [1 + \sin\{(k-1) \times .\} \times .] \quad (1)$$

$$0 \ldots < 1 \quad (2)$$

where
.c is the center wavelength of reflection band,
n is the refraction index of the layer for the d-line,
d is the physical thickness of the layer,
. is a factor of a pitch angle represented by 2./the number of layers a one layer-stack,
. is the rate of amplitude.

9 Claims, 22 Drawing Sheets

OPTICAL FILTER

BACKGROUND OF THE INVENTION

1. Field of the invention

The present invention relates to an optical filter with a multilayer thin film comprising a plurality of layers stacked on a transparent substrate for attenuating light in a specified wavelength band.

2. Description of Related Art

There have been known optical filters having the optical properties that reflect light in a specified wavelength band centered at a reference wavelength and transmit light out of the specified wavelength band. One of these optical filters which has a high reflection band and high transmittance bands on opposite sides of the high reflection band is usually referred to as minus filter. Minus filters have multilayer film structures basically comprising alternate layers of high refractive index and low refractive index. In particular, such a minus filter as is capable of reflecting light in a relatively narrowband, such as several tens of nanometers, which is called a narrowband minus filter, is realized by forming the high refractive index layers larger in physical thickness than the low refractive index layers. Additional details of a basic structure of the minus filter may be obtained by reference to "Thin-Film Optical Filters" by H. A. Macleod, page 116, (1969, published by ADAM HILGER LTD).

Further, Japanese Unexamined Patent Publication No. 2002-333519 describes a minus filter which has a narrow reflection band realized by forming high and low refractive index layers which are made equal in physical thickness to one another and, at the same time, gradually changed in refractive index, respectively, in a stacking direction of the multilayer thin film.

When it is intended to provide the minus filter described in "Thin-Film Optical Filters" with a quite narrow reflection band, it is essential to satisfy the strict requirement that the low refractive index layers must be formed extremely thin and, on that account, must be precisely controlled to have desired physical thicknesses at a stage of thin film formation. In addition, because the multilayer thin film looses a balance of stress due to a quite large ratio of physical thickness between the high and the low refraction index layer even though it may be realized to perform the precise control of physical thickness of the low refractive index layers, the multilayer thin film has a chance to encounter deterioration in its own mechanical and thermal durability. Because a quantity of reflected light becomes smaller as the reflection band becomes narrower, it is necessary for the minus filter to make up for a reflectivity by increasing the number of layers.

In the attempt to realize the minus filter having a reflection band centered at a desired wavelength, it is required to control distributions of refractive indices of the high refractive index layers and the low refractive index layers in a stacking direction extremely precisely. This precise control of refractive index distribution counts against production adaptability, such as a production efficiency and a yield rate, of the minus filter.

SUMMARY OF THE INVENTION

It is therefore an object of the present invention to provide an optical filter having a high reflectivity of reflection band.

It is another object of the present invention to provide an optical filter having a high degree of design freedom in terms of a bandwidth and a center wavelength of reflection band.

The foregoing objects of the present invention are accomplished by an optical filter having a multilayer tin film comprising a plurality of layers which are stacked in alternate layers of high and low refractive indices on a transparent substrate, the high refractive index layers and the low refractive index layers cyclically changing in optical thicknesses, respectively, throughout the multilayer thin film in a stacking direction.

The optical filter thus structured is enabled to have a reflection band centered at a desired wavelength and having a desired bandwidth without making the low refractive index layers extremely thin and to cause reflection of infrared light as well. It is preferred that the optical filter has a reflection band in each of a wavelength band between 550 nm and 620 and a wavelength and upwards of 670 nm.

According to the optical filter according to a preferred embodiment, each of k-th from-the-bottom alternate layers of high and low refractive indices has an optical thickness (n×d) meeting the following conditional expressions (1) and (2), concurrently:

$$n \times d = (.c/4) \times [1 + \sin\{k-1) \times .\} \times .] \quad (1)$$

$$0 \ldots < 1 \quad (2)$$

where
.c is the center wavelength of reflection band,
n is the refraction index of the layer for the d-line,
d is the physical thickness of the layer,
. is a factor of a pitch angle represented by 2./the number of layers for one layer-stack
. is the rate of amplitude.

According to the optical filter according to another preferred embodiment, every odd-numbered layer has an optical thickness (n×d) meeting the following conditional expressions (3) to (5), concurrently, and every even-numbered layer has an optical thickness (n×d) meeting the following conditional expressions (5) and (6), concurrently:

$$n \times d = \beta \times (.c/4) \times [1 + \sin\{((2m-1)-1) \times .\} \times] \quad (3)$$

$$\beta < 1 \quad (4)$$

$$n \times d(.c/4) \times [1 + \sin\{(2m-1) \times .\} \times] \quad (6)$$

where
m is a natural number,
.c is the center wavelength,
n is the refraction index of the layer for the center wavelength .c,
d is the physical thickness of the layer,
. is the pitch angle represented by 2./the number of layers of one layer-stack,
. is the rate of amplitude,
β is the ratio of optical thickness which is a fixed positive value defining a ratio of a mean optical thickness of the odd-numbered layers relative to a mean optical thickness of the even-numbered layers.

The optical filter may further comprise a base layer which is formed between the multilayer thin film and the transparent substrate and has a refractive index between indices of the high refractive index layer and the low refractive index layer.

The optical filter of the present invention is effective when incorporated in an image pickup device of an imaging system, especially such as a medical endoscope, for internal body observation and taking pictures of an internal body which is rich in red color component. The image pickup device equipped with the optical filter provides a high contrast of image of an affected area of an internal body and, in consequence, distinctiveness of the affected area. This feature facilitates observation of affected areas of an internal body when viewing them through endoscope having an image pickup device equipped with the optical filter.

BRIEF DESCRIPTION OF THE DRAWINGS

The foregoing and other objects and features of the present invention will be clearly understood from the following detailed description when reading with reference to the accompanying drawings where, on the graphic representation of an optical thickness distribution, the optical thickness (n×d) is represented by the scale reading multiplied by a center wavelength (.c) and in which.

DETAILED DESCRIPTION OF THE PREFERRED EMBODIMENTS

In the following description, the term "layer-stack" as used herein shall mean and refer to a fundamental repetitive sequence of layers which cyclically change in optical thickness and the respective layer-stacks are structure as an integrated multilayer thin film.

Figure 1:
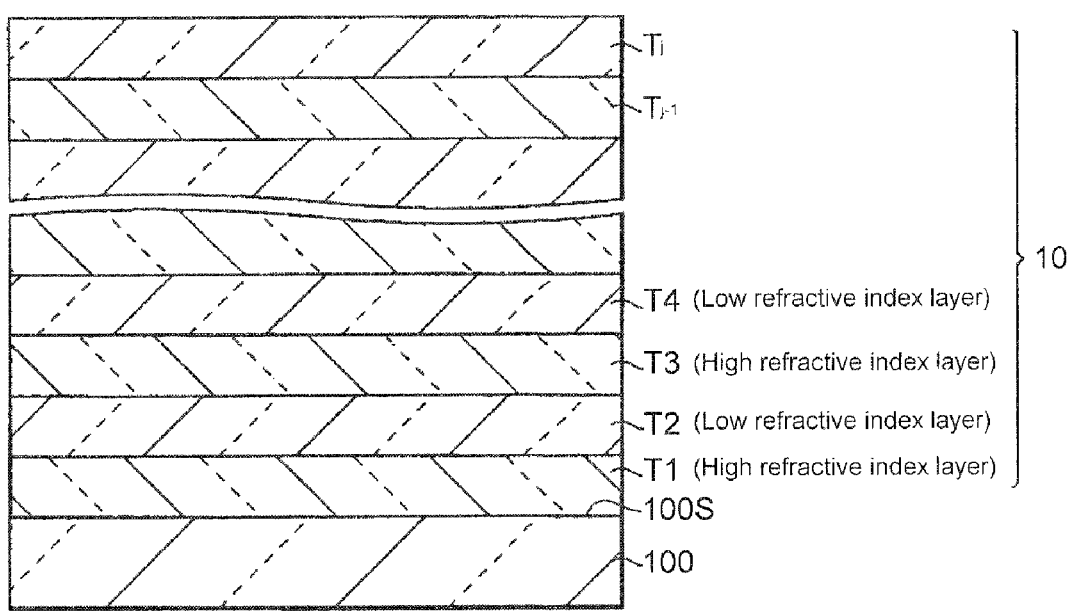
FIG. 1 is a schematic cross-sectional view of an optical filter of the present invention.
Figure 2A:
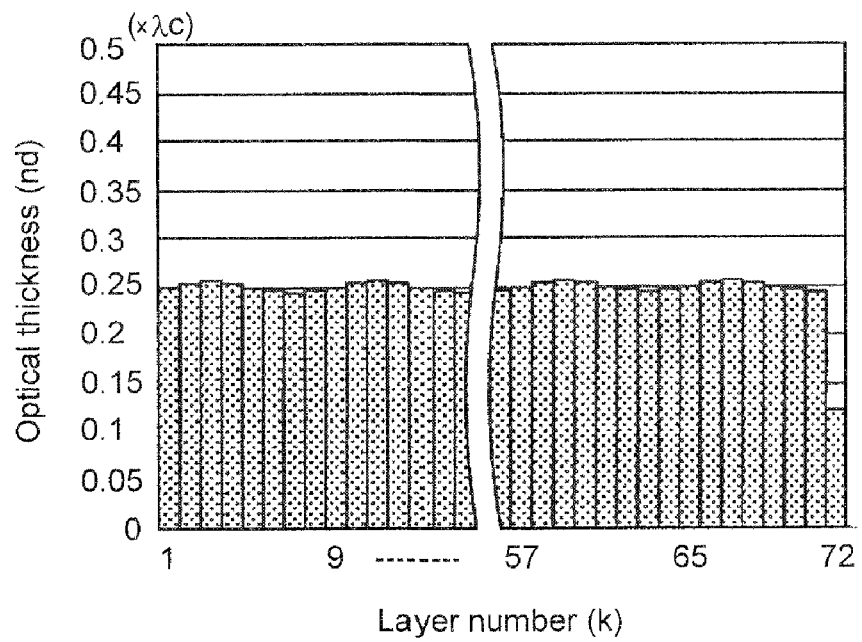
FIGS. 2A and 2B are graphic representations of an optical thickness distribution and a spectral transmittance distribution, respectively, of a first example of the optical filter of a first embodiment.
Figure 2B:
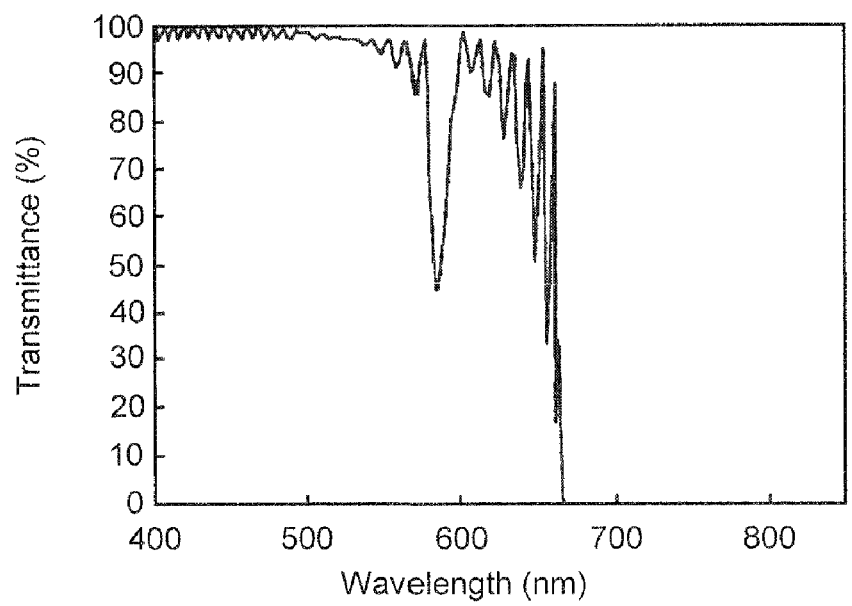

Referring to the accompanying drawings in detail and, in particular, to FIG. 1 showing an optical filter having a multilayer din film 10 according to an embodiment of the present invention, the optical filter comprises a transparent substrate 100, such as a glass board or a plastic board, having a substrate surface 100S, flat or curved, and a multilayer thin film 10 formed on the substrate surface 100S of the transparent substrate 100. The multiple multilayer thin film 10 comprises first to j-th layers T1, T2, . . . , $T_{j-1}$ and $T_j$ stacked in this order from the transparent substrate 100. The transparent substrate 100 can be an optical lens having a spherical surface or an aspherical surface as the substrate surface 100S without impinging upon effects of the present invention. The transparent substrate 100 may be made of a transparent glass material or a transparent crystal material such as calcium fluoride glass ($CaF_2$), silicon dioxide glass ($SiO_2$), BK7 (Schott A. G.: Germany), LF1 (Schott A. G.: Germany), etc.

The multilayer thin film 10 comprises a plurality of layer-stacks formed on top of another, each layer-stack comprising alternate layers of high refractive index and low refractive index. In this embodiment, the odd-numbered layers, namely the bottom or first layer T1, the third layer T3, . . . , the (2m-1)-th layer T(2m-1), . . . where in is a natural number), have the same high refractive index. The even-numbered layers, namely the second layer T2, the fourth layer T4, . . . , the 2m-th layer T(2m), . . . , have the same low refractive index. The terms "high refractive index" and "low refractive index" as used herein shall mean relative refractive indices. The high refractive index layer and the low refractive index layer may be replaced with each other. Although it is preferred that the high refractive index layers have the same refractive index, nevertheless, it is allowed that some of the high refractive index layers may exceptionally have refractive indices different from the remaining layers. The same is true of the low refractive index layers. Examples of available constituents for the high refractive index layers include zinc sulfide (ZnS), titanium oxide ($TiO_2$), niobium oxide ($Nb_2O_5$), tantalum oxide ($Ta_2O_5$), Substance H4 containing lantern titanate ($LaTiO_3$) as a primary component (Merck A. G.: Germany), zirconium oxide ($ZrO_2$), hafnium oxide ($HfO_2$), cerium oxide ($CeO_2$), Substance M3 (Merck A. G.: Germany), yttrium oxide ($Y_2O_3$), and mixtures or compounds of two or more of these chemical substances which have refractive indices, for example, beyond 1.7 but less than 2.5 for the d-line. On the other hand, examples of available constituents for the low refractive index layers having a refractive index relatively lower than the high refractive index layers include silicon dioxide ($SiO_2$), aluminum oxide ($Al_2O_3$), Substance M1 (Merck A. G.: Germany) and Substance M2 (Merck A. G.: Germany), and mixtures or compounds of two or more of these oxides which have refractive indices, for example, beyond 1.38 but less than 1.7 for the d-line. Further, Substance M3 or yttrium oxide ($Y_2O_3$) may be employable for the low refractive index layers according to a constituent used for the high refractive index layer.

The optical filter may have an interlayer having a middle refractive index between indices of the high and the low refractive index layer which is provided between the transparent substrate 100 and the multilayer to film 10 for facilitating fine adjustment and optimization of a spectral transmittance distribution of the optical filter.

The first to j-th layers T1-Tj are formed so as to cyclically change in optical thickness throughout the multilayer thin film 10 in a stacking direction thereof. For example, each of the k-th from-the-bottom alternate layers is designed to have an optical thickness (n×d) meeting the following conditional expressions (1) and (2) concurrently:

$$n \times d = (.c/4) \times [1 + \sin\{(k-1) \times .\} \times .] \quad (1)$$

$$0 \ldots < 1 \quad (2)$$

where
.c is the center wavelength of reflection band,
n is the refraction index of the layer for the d-line,
d is the physical thickness of the layer,
. is a factor of a pitch angle represented by 2./the number of layers a one layer-stack,
. is the rate of amplitude which shall mean and refer to a fixed value defining a margin of change in optical thickness of the layer with respect to the thickness of a reference layer specified by $\sin\{(l-1) \times . = 0$.

The general idea that optical thicknesses of the layers cyclically changes throughout the multilayer thin film, 10 in a stacking direction is not always limited to layers whose optical thicknesses strictly meet the conditional expression (1) but allows layers to be subjected to compensatory adjustment of optical thicknesses for the sake of a desired spectral transmittance distribution of the optical filter.

As described above, the optical filter has a multilayer thin film which comprises alternate layers of high refractive index and low refractive index cyclically changing in optical thickness in a stacking direction thereof. The optical filter thus structured is enabled to have a reflection band centered at a desired wavelength and a desired bandwidth of the reflection band ranging, for example, from 550 to 620 nm without making the low refractive index layers too thin to assure controllability of physical thickness of the layers during the production process. Furthermore, the optical filter is capable of reflecting infrared light of wavelengths longer than 670 nm. In consequence, even though the multilayer thin film is integrated into a compactly stacked structure, it has such reflective characteristics as sheared not only by an infrared cut filter having a reflection band in the infrared region but also by a minus filter having a specified reflection band on the shorter wavelength side of the infrared region and, on this account, performs such optical functions as not fulfilled by conventional optical filters.

In the above specific embodiment, although the multilayer thin film comprises odd-numbered layers (high refractive index layers) and even-numbered layers (low refractive index layers), an optical thickness of the individual layer meeting the conditional expression (1), the optical filter is not exclusively limited to the embodiment. Alternatively, the multilayer thin film may, for example, comprise odd-numbered layers, i.e. the (2m-1)-th layers from the bottom layer, optical thicknesses of which meet the following conditional expressions (3), (4) and (5), concurrently, and even-numbered layers, i.e. the 2m-th from-the-bottom layers optical thicknesses of which meet the following conditional expression (5) and (6), concurrently.

$$n \times d = \beta \times (.c/4) \times [1 + \sin\{((2m-1)-1) \times x.\} \times .] \quad (3)$$

$$\uparrow < 1 \quad (4)$$

$$0 \ldots < 1 \quad (5)$$

$$n \times d = (.c/4) \times [1 + \sin\{(2m-1) \times .\} \times .] \quad (6)$$

where
n is the refraction index of the layer for the d-line,
d is the physical thickness of the layer,
.c is a center wavelength,
. is a factor of a pitch angle represented by 2./the number of layers of one layer-stack,
. is the rate of amplitude which is a fixed value defining a margin of change in optical thickness of the layer with respect to the thickness of a reference layer specified by $\sin\{(k-1) \times . = 0$,
β is the ratio of optical thickness which shall man and refer to a positive fixed value defining a ratio of a mean optical thickness of the odd-numbered layers relative to a mean optical thickness of the even-numbered layers.

The optical filter of his alternative embodiment is provided with a desired reflectance characteristic through precise adjustment of a center wavelength and a bandwidth of a reflection band.

The following description is directed to various practical examples of optical filters embodying the present invention, each optical filter having a multilayer thin film 10 on a transparent substrate 100 made of BK7 (Schott A. G.: Germany). The multilayer thin film 10 comprised alternative layers of high refractive index and low refractive index, each layer having an optical thickness meeting the conditional expressions (1) and (2). The respective high refractive index layers were made up of tantalum oxide ($Ta_2O_5$) having a refractive index of approximately 2.2, and the respective low refractive index layers were made up of silicon dioxide glass ($SiO_2$) having a refractive index of approximately 1.46. In the following embodiments, the refractive index of medium (air) was taken as 0 (zero).

Embodiment I

Six optical filters PEI-1 to PEI-6 were prepared as practical examples of the first embodiment, and one optical filter CEI-1 as a comparative example. Table I shows specific numerical data of the practical optical filters PEI-1 to PEI-6 and the comparative optical filter CEI-1. As shown in Table I, the individual optical filter, practical or comparative, was made up of nine layer-stacks identical with one another, each layer-stack consisting of eight alternative layers of high refractive index and low refractive index, and hence, made up of 72 layers in total and had a reflection band centered at a wavelength of 750 nm.

TABLE I

|  | Center wavelength (.c nm) | Ratio of optical thickness (β) | Rate of amplitude(a) | Pitch angle (θ°) | Number of layer-stacks | Total number of layers |
| --- | --- | --- | --- | --- | --- | --- |
| CEI-1 | 750 | 1 | 0 | 45 | 9 | 72 |
| PEI-1 | 750 | 1 | 0.025 | 45 | 9 | 72 |
| PEI-2 | 750 | 1 | 0.05 | 45 | 9 | 72 |
| PEI-3 | 750 | 1 | 0.075 | 45 | 9 | 72 |
| PEI-4 | 750 | 1 | 0.1 | 45 | 9 | 72 |
| PEI-5 | 750 | 1 | 0.2 | 45 | 9 | 72 |
| PEI-6 | 750 | 1 | 0.3 | 45 | 9 | 72 |

As shown in Table I, the practical optical filters PEI-1 to PEI-6 were different only in the rate of amplitude (.) from one another. The comparative optical filter CEI-1 had the same numerical data as the practical optical filters PEI-1~PEI-6, except for the rate of amplitude. The comparative optical filter CEI-1 had a rate of amplitude of 0 (zero) which means that all of the layers have the same optical thickness (n×d=0.25.c).

Figure 21A:
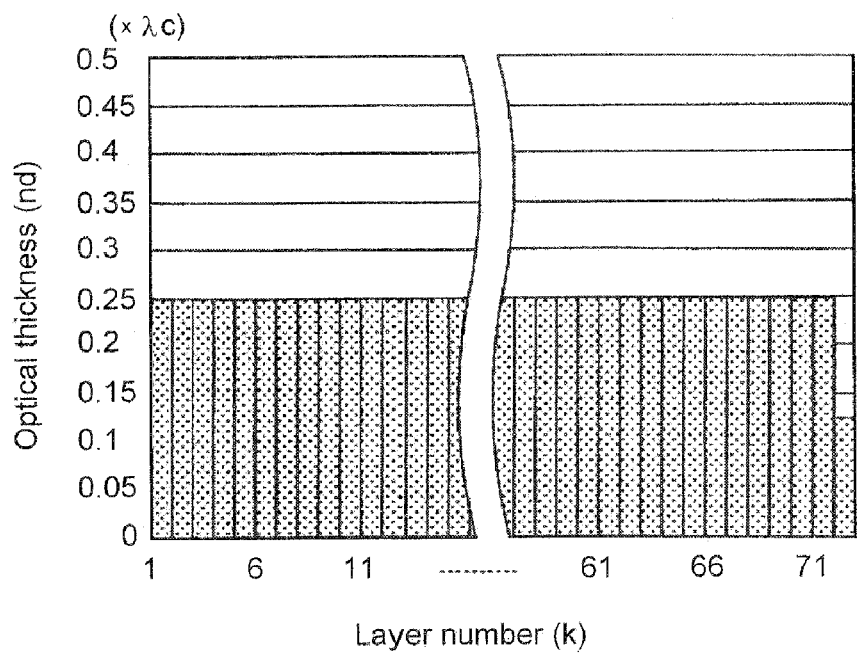
FIGS. 21A and 21B are graphic representations of an optical thickness distribution and a spectral transmittance distribution, respectively, of an optical filter of a first comparative example.
Figure 21B:
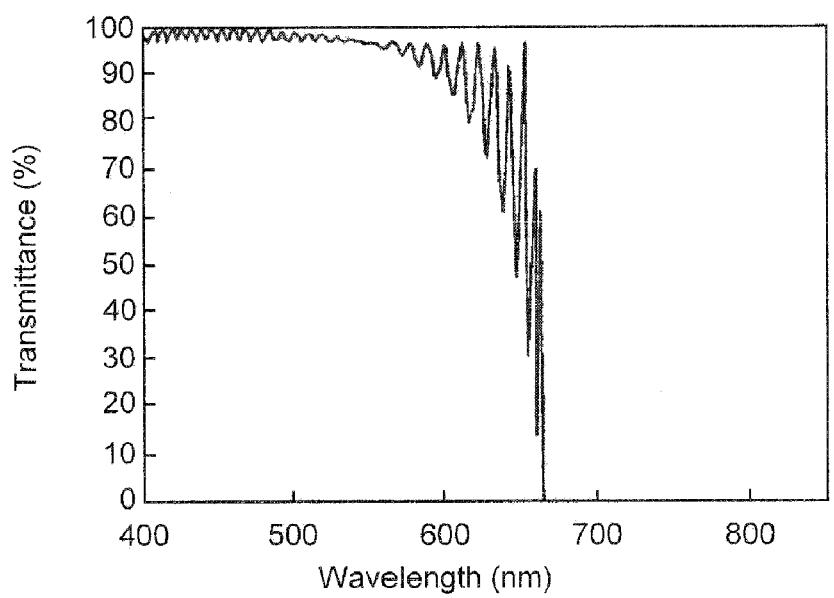

Investigation was conducted in order to assess the correlation between distributions of optical thickness and spectral transmittance of the practical optical filters PEI-1 to PEI-6. The results of investigation are shown in FIGS. 2A and 2B to 7A and 7B, respectively. For comparison, distributions of optical thickness and spectral transmittance of the comparative optical filter CEI-1 are shown in FIGS. 21A and 21B, respectively.

Referring to FIGS. 2A and 2B to 7A and 7B representing distributions of optical thickness and spectral transmittance of the practical optical filters PEI-1 to PEI-6, respectively, it is proved that the practical optical filter PEI-1~PEI-6 of the first embodiment has a spectral transmittance of approximately 0 (zero) in a wavelength band upwards of about 670 nm and has a reflection band having a half-bandwidth of less than 50 nm near 580 nm. In contrast, although the comparative optical filter CEI-1 has a spectral transmittance of approximately 0 (zero) in a wavelength band upwards of about 670 nm, there is no reflection band clearly distinguishable near 580 nm. Furthermore, among the practical optical filters, only the practical optical filters PEI-1 to PEI-6 have secondary reflection bands near 490 nm. Particularly, the fifth and the sixth practical optical filters PEI-4 and PEI-5 have third reflection bands near 430 nm. It is also found that the optical filter comprising the layers meeting the conditional expressions (1) and (2) has a reflection band which increases in bandwidth as the rate of amplitude increases and a spectral transmittance which decreases as the rate of amplitude increases.

Embodiment II

Two optical filters PEII-1 and PEII-2 were prepared as practical examples of the second embodiment, and one optical filter CEII-1 as a comparative example. Table II shows specific numerical data of the respective optical filters PEII-1 to PEII-2 and CEII-1. As shown in Table II, the practical optical filters PEII-1 and PEII-2 of the second embodiment had the same specific numerical data as the practical optical filter PEI-2 of the previous embodiment, except for pitch angles (.) and the numbers of layer stacks. The comparative optical filter CEII-1 was similar to the practical optical filters PEII-1 and PEII-2 and, however, had a pitch angle of 0° which means that all of the layers have the same optical thickness (n×d=0.25.c). The practical optical filter PEII-1 was made up of six layer-stacks, each layer-stack consisting of 12 alternative layers of high refractive index and low refractive index, and hence, made up of 72 layers in total and the practical optical filter PEII-2 was however made up of 12 layer-stacks, each layer-stack consisting of six alternative layers of high refractive index and low refractive index, and hence, made up of 72 layers in total.

TABLE II

|  | Center wavelength (.c nm) | Ratio of optical thickness (β) | Rate of amplitude(a) | Pitch angle (θ°) | Number of layer stacks | Total number of layers |
| --- | --- | --- | --- | --- | --- | --- |
| CEII-1 | 750 | 1 | 0.05 | 0 |  | 72 |
| PEII-1 | 750 | 1 | 0.05 | 30 | 6 | 72 |
| PEII-2 | 750 | 1 | 0.05 | 60 | 12 | 72 |

Figure 22A:
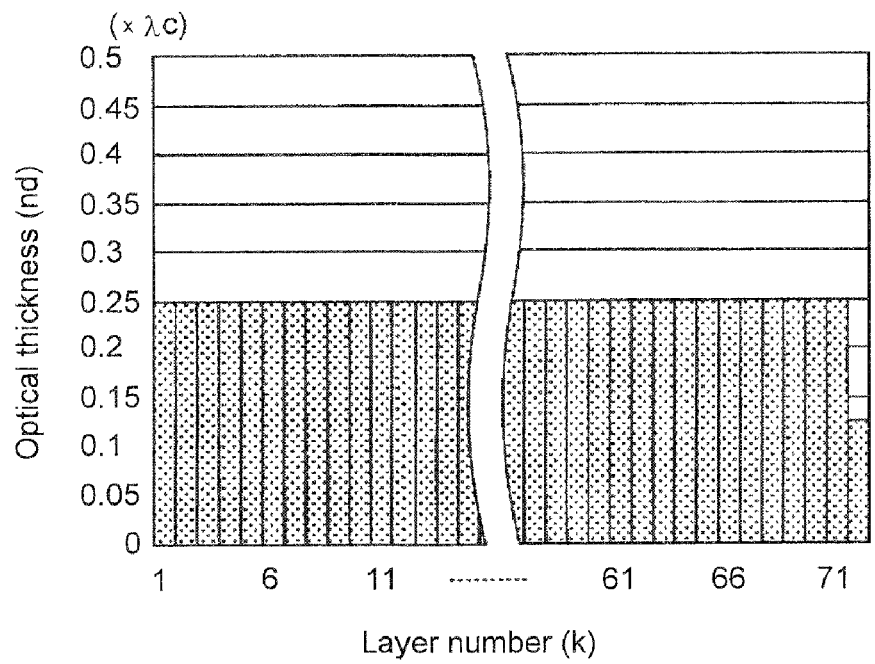
FIGS. 22A and 22B are graphic representations of an optical thickness distribution and a spectral transmittance distribution, respectively, of an optical filter of a second comparative example.
Figure 22B:
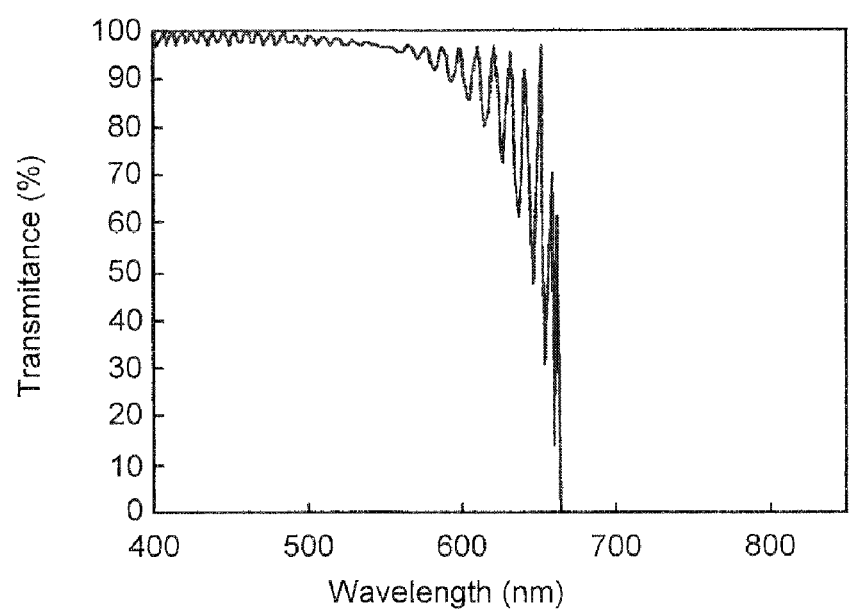

Investigation was conducted in order to assess the correlation between distributions of optical thicknesses and spectral transmittance of the optical filters of the first embodiment. The results of investigation are shown in FIGS. 8A and 8B to 9A and 9B, respectively. For comparison, distributions of optical thicknesses and spectral transmittance of the comparative optical filter CEII-1 are shown in FIGS. 22A and 22B, respectively.

Figure 8A:
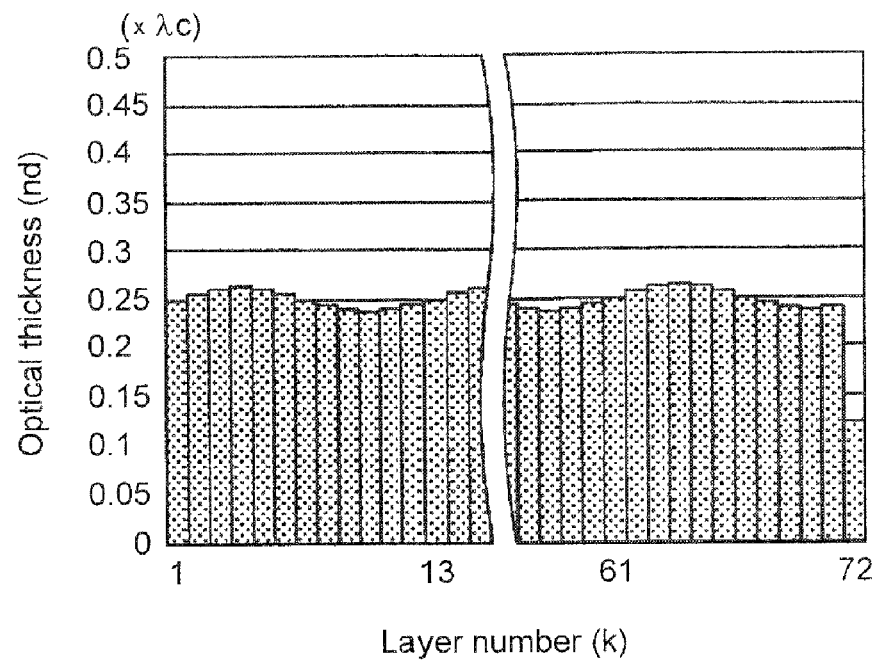
FIGS. 8A and 8B are graphic representations of an optical thickness distribution and a spectral transmittance distribution, respectively, of a first example of the optical filter of a second embodiment of the present invention.
Figure 8B:
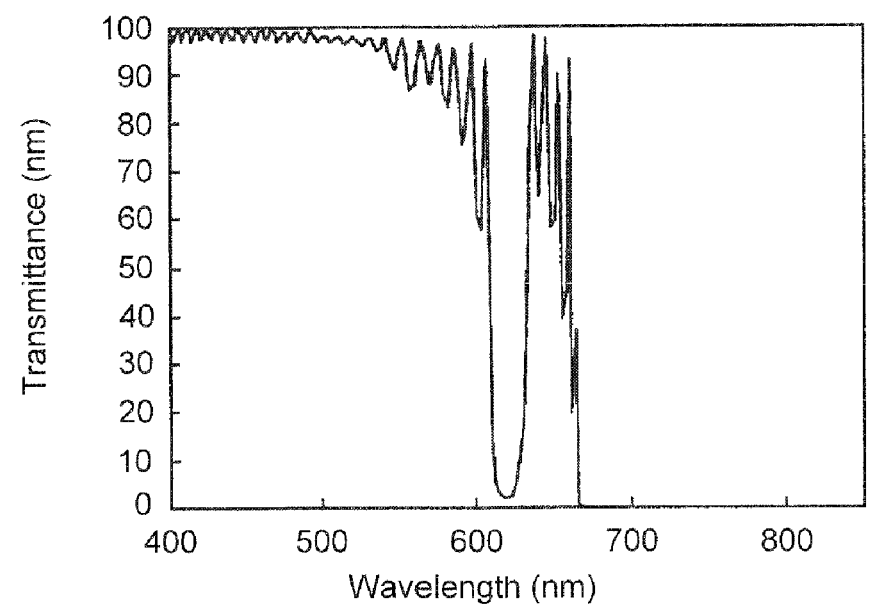
Figure 9A:
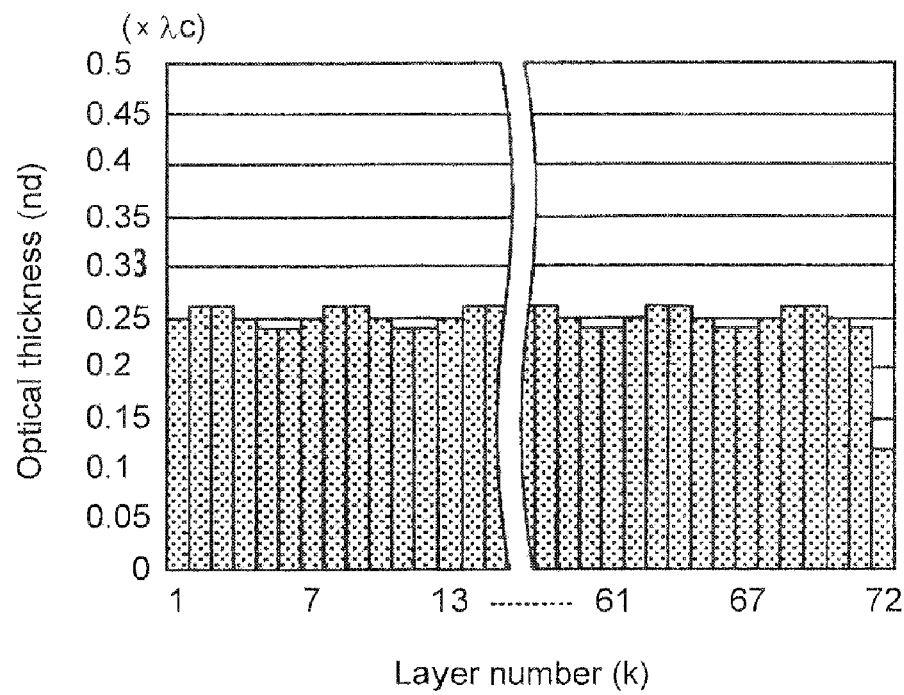
FIGS. 9A and 9B are graphic representations of an optical thickness distribution and a special transmittance distribution, respectively, of a second example of the optical filter of the second embodiment.
Figure 9B:
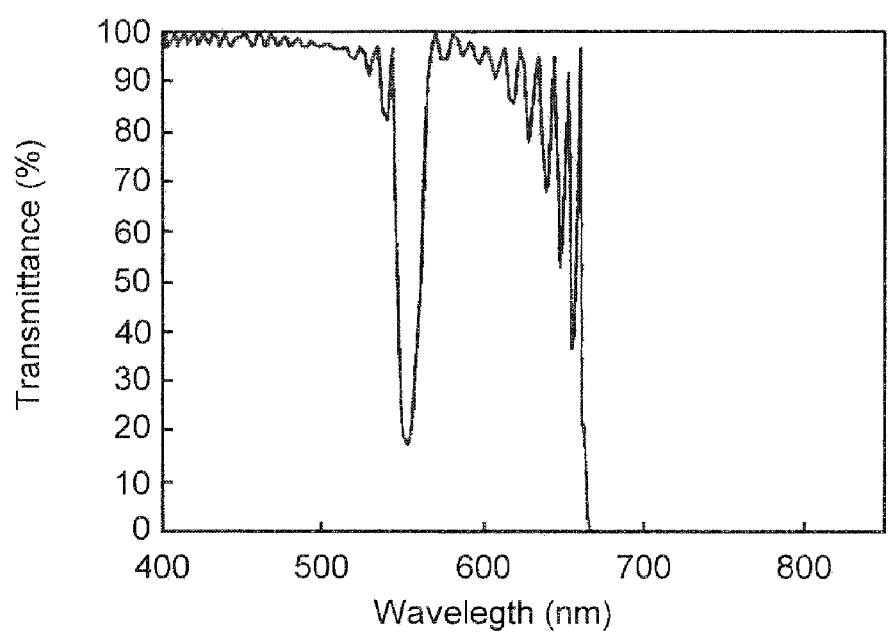
Figure 10A:
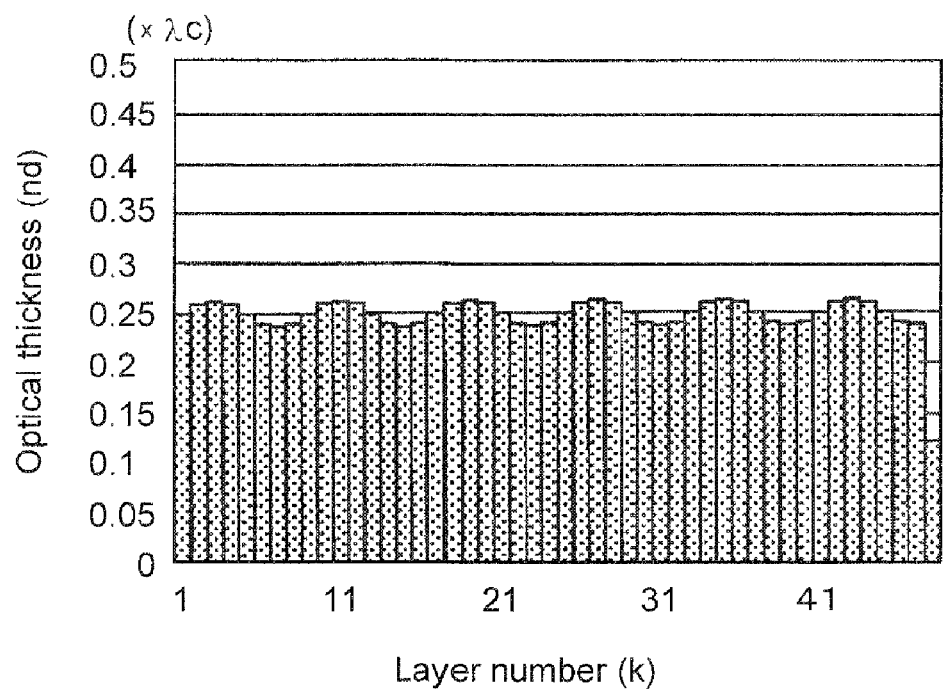
FIGS. 10A and 10B are graphic representations of an optical thickness distribution and a spectral transmittance distribution, respectively, of a first example of the optical filter of a third embodiment.
Figure 10B:
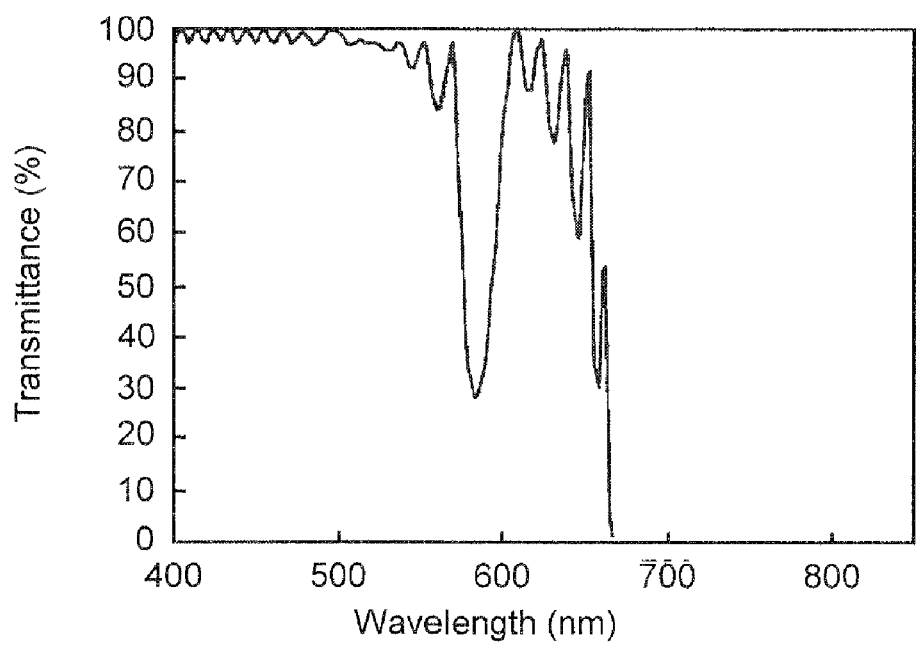
Figure 11A:
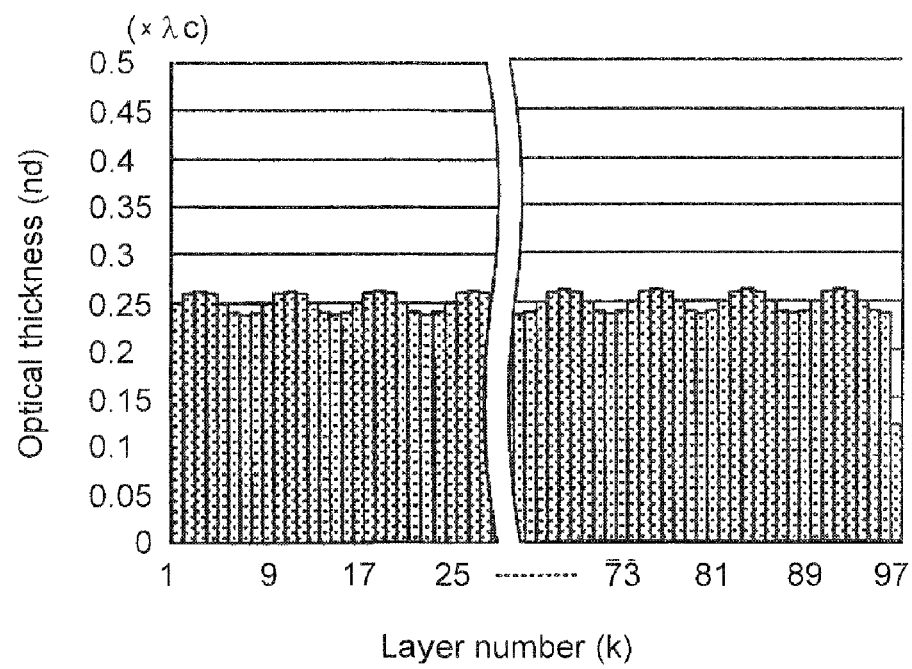
FIGS. 11A and 11B are graphic representations of an optical thickness distribution and a spectral transmittance distribution, respectively, of a second example of the optical filter of the third embodiment.
Figure 11B:
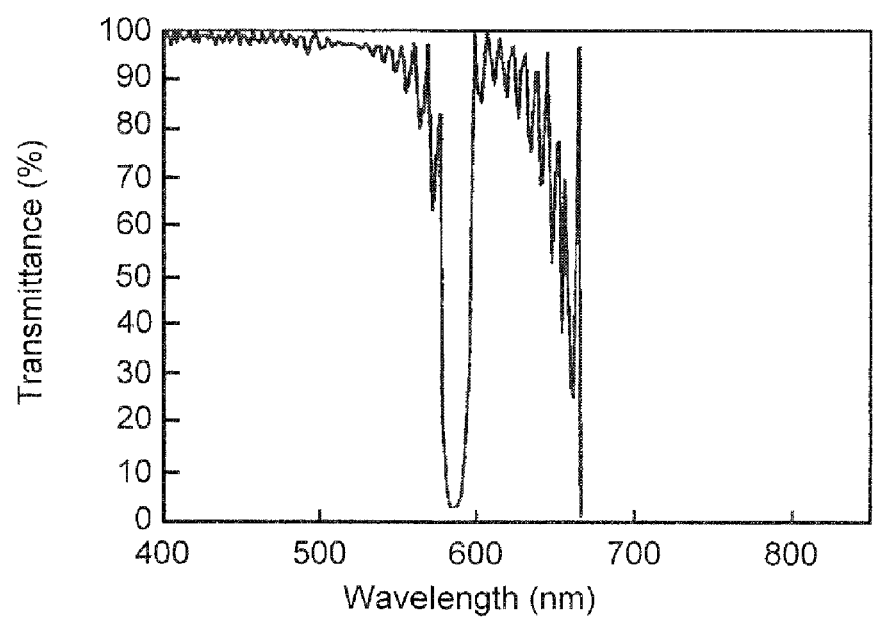
Figure 12A:
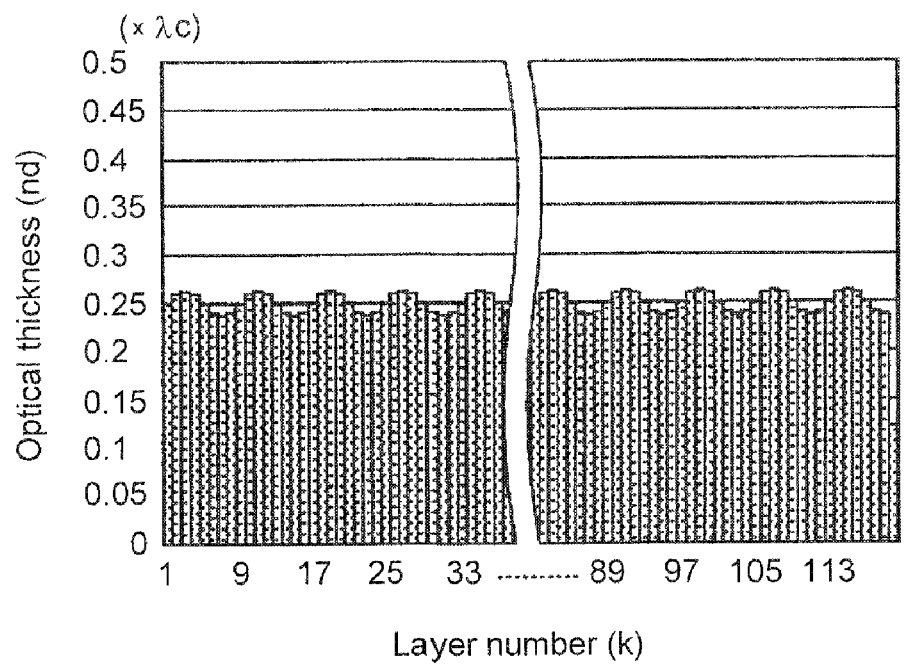
FIGS. 12A and 12B are graphic representations of an optical thickness distribution and a spectral transmittance distribution, respectively, of a third example of the optical filter of the third embodiment.
Figure 12B:
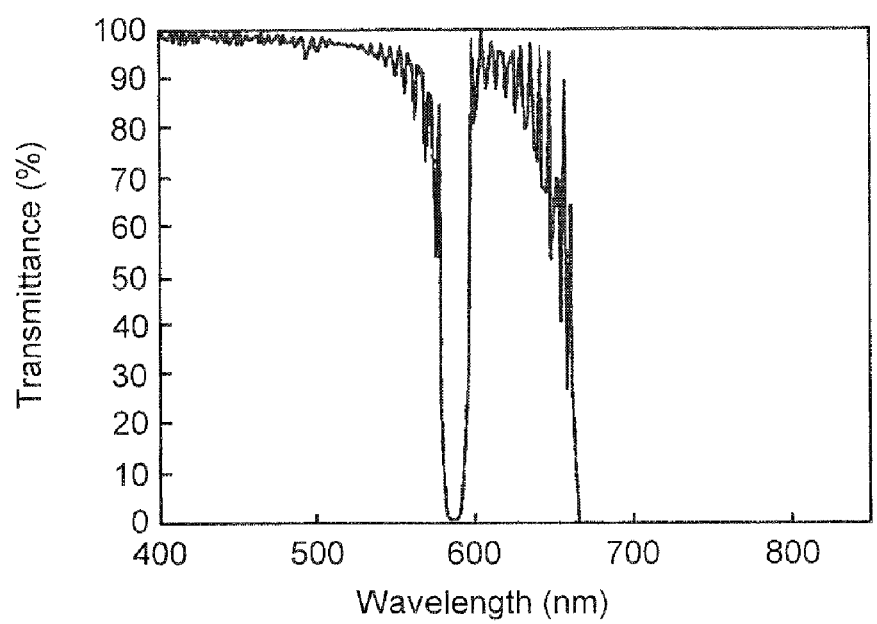
Figure 13A:
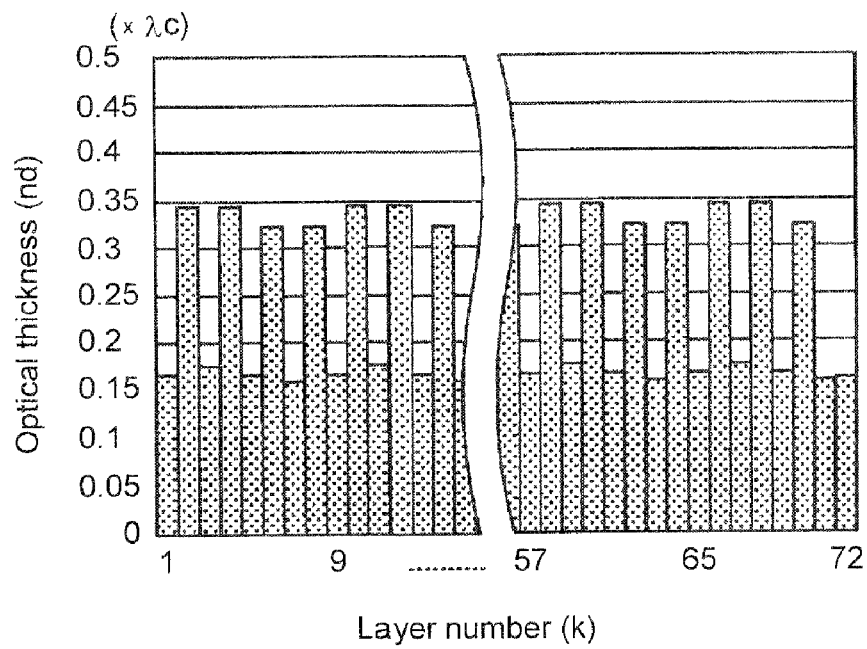
FIGS. 13A and 13B are graphic representations of an optical thickness distribution and a spectral transmittance distribution, respectively, of a fourth example of the optical filter of a fourth embodiment.
Figure 13B:
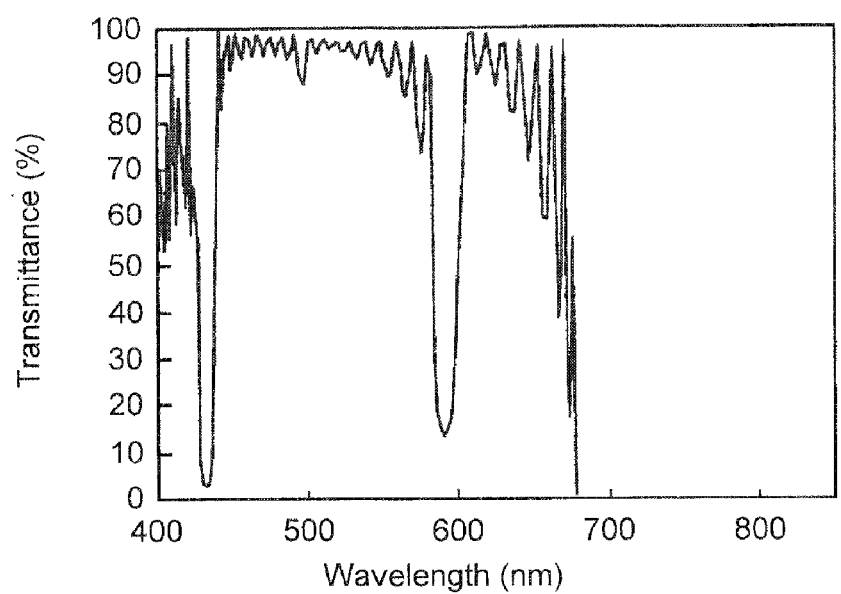
Figure 14A:
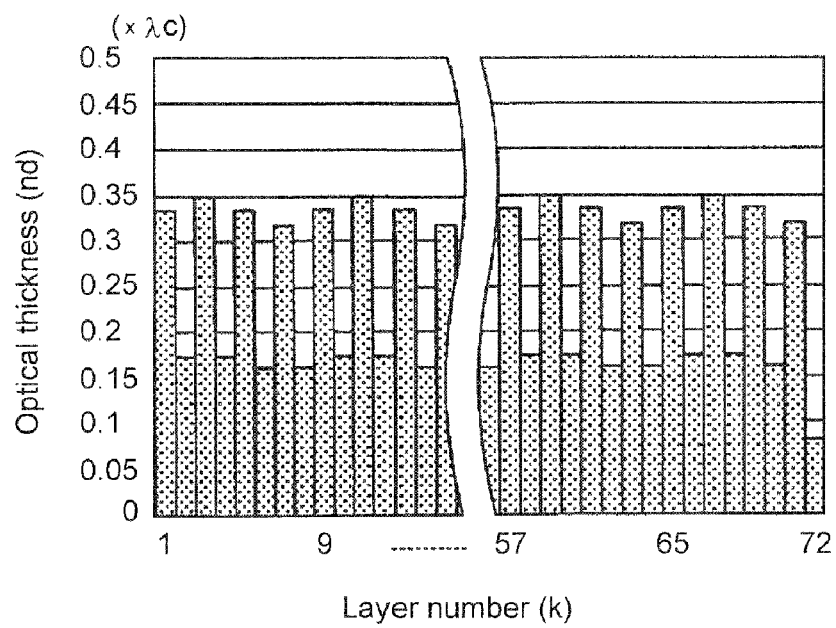
FIGS. 14A and 14B are graphic representations of an optical thickness distribution and a spectral transmittance distribution, respectively, of the fourth example of the optical filter of the fourth embodiment.
Figure 14B:
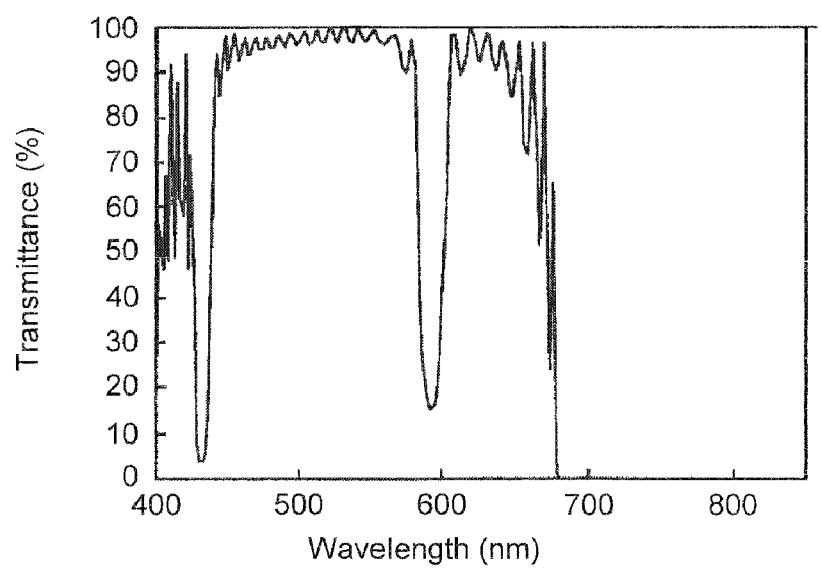

As shown in FIGS. 8A and 8B representing distributions of optical thickness and spectral transmittance of the first practical optical filter PEII-1, respectively, it is proved that the practical optical filter PEII-1 has a spectral transmittance of approximately 0 (zero) in a wavelength band upwards of 670 nm and has a reflection band near 620 nm. In contrast although the comparative optical filter CEII-1 has a spectral transmittance of approximately 0 (zero) in a wavelength band upwards of about 670 nm. Further, as shown in FIGS. 9A and 9B representing distributions of optical thickness and spectral transmittance of the practical optical filter PEII-2, respectively, it is proved that the practical optical filter PEII-2 has a spectral transmittance of approximately 0 (zero) in a wavelength band upwards of 670 nm and has a reflection band near 550 nm as well. In contrast, although the comparative optical filter CEII-1 has a spectral transmittance of approximately 0 (zero) in a wavelength band upwards of about 670 nm, there is no reflection band clearly distinguishable near 580 nm. As a result of the comparative investigation, it is found that the optical filter having the numerical data in Table II has a reflection band that is shifted toward a side of shorter wavelength as the rate of amplitude (.) increases.

Embodiment III

Three optical filters PEIII-1 to PEIII-3 were prepared as practical examples of the third embodiment. Table III shows specific numerical data of the respective practical optical filters PEIII-1 to PEIII-3. As shown in Table III, the practical optical filters PEIII-1 to PEIII-3 had the same specific numerical data as the practical optical filter PEI-2 of the first embodiment, except for the number of layer-stacks and the total number of layers, respectively. Specifically, the practical optical filter PEIII-1 to PEIII-3 were made up six, 12 and 15 layer-stacks, respectively, each of which consisted of the same number of, i.e. eight alternative layers of high refractive index and low refractive index, and consisted of 48, 96 and 150 layers in total, respectively.

TABLE III

| | Center wavelength (.c nm) | Ratio of optical thickness (β) | Rate of amplitude(a) | Pitch angle (θ°) | Number of layer stacks | Total number of layers |
|---|---|---|---|---|---|---|
| PEIII-1 | 750 | 1 | 0.05 | 45 | 6 | 48 |
| PEIII-2 | 750 | 1 | 0.05 | 45 | 12 | 96 |
| PEIII-3 | 750 | 1 | 0.05 | 45 | 15 | 120 |

Investigation was conducted in order to assess the correlation between distributions of optical thicknesses and spectral transmittance of the practical optical filters PEIII-1 to PEIII-3. The results of investigation are shown in FIGS. 10A and 10B to 12A and 12B, respectively. As shown in FIGS. 10A and 10B to 12A and 12B representing distributions of optical thickness and spectral transmittance of the first to the third practical optical filter PEIII-1 to PEIII-3, respectively, it is proved that each practical optical filter PEIII-1~PEIII-3 has a spectral transmittance of approximately 0 (zero) in a wavelength band upwards of 670 nm and has a reflection band near 580 nm. It is found from a comparison with the practical optical filter PEI-2 of the first embodiment that the poetical optical filters PEIII-1 to PEIII-3 decreases their spectral transmittance as the number of layer-stacks, and hence the total number of layers, increases. In this case, the reflection band does not bring about a significant change in bandwidth differently from the case where the rate of amplitude(α) is altered.

Embodiment IV

Two optical filters PEIV-1 and PEIV-2 were prepared as practical examples of the forth embodiment. Table IV shows specific numerical data of the respective practical optical filters PEIV-1 and PEIV-2. As shown in Table IV, the practical optical filters PEIV-1 and PEIV-2 had the same specific numerical data as the second practical optical filter PEI-2 of the first embodiment, except for the ratio of optical thickness (β) between layers of high refractive index and low refractive index.

TABLE IV

| | Center wavelength (.c nm) | Ratio of optical thickness (β) | Rate of amplitude(a) | Pitch angle (θ°) | Number of layer stacks | Total number of layers |
|---|---|---|---|---|---|---|
| PE IV-1 | 750 | 0.5 | 0.05 | 45 | 9 | 72 |
| PE IV-2 | 750 | 2 | 0.05 | 45 | 9 | 72 |

Investigation was conducted in order to assess the correlation between distributions of optical thicknesses and spectral transmittance of the practical optical filters PEIV-1 and PEIV-2. The results of investigation are shown in FIGS. 13A to 13B and 14A and 14B, respectively. As shown in FIGS. 13A and 13B to 14A and 14B representing distributions of optical thickness and spectral transmittance of the practical optical filters PEIV-1 and PEIV-2, it is proved that each practical optical filter PEIV-1, PEIV-2 has a spectral transmittance of approximately 0 (zero) in a wavelength band upwards of 670 nm and has a reflection band near 580 nm. In this case, the practical optical filter PEIV-1, PEIV-2 has a reflection band remaining almost unchanged in bandwidth and reflectance irrespective of the ratio of optical thickness (β). Furthermore, it is found that the practical optical filter PEIV-1, PEIV-2 brings about a reflection band near 430 nm which does not appear in the practical optical filter PEI-2 of the first embodiment.

Embodiment V

Figure 3A:
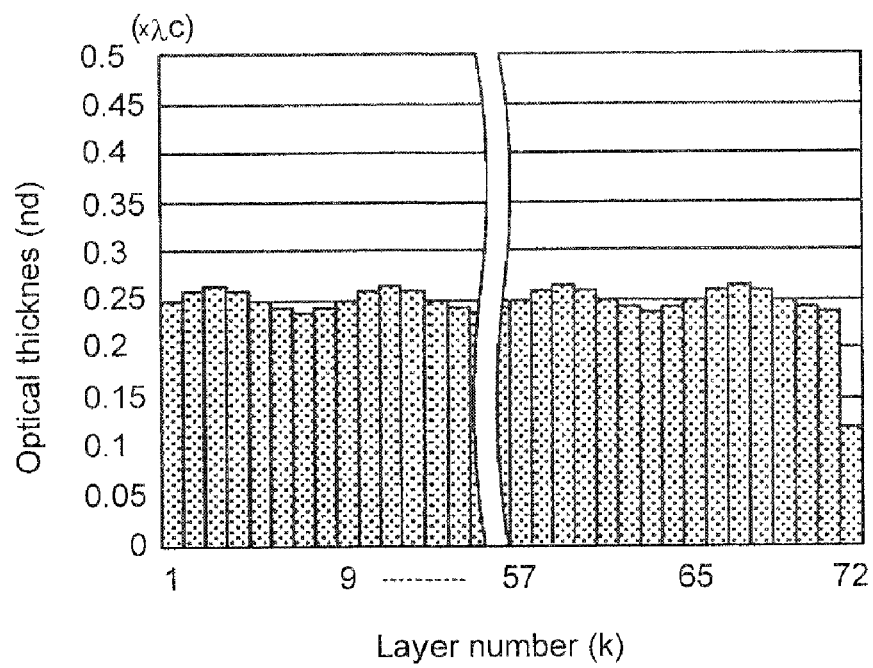
FIGS. 3A and 3B are graphic representations of an optical thickness distribution and a spectral transmittance distribution, respectively, of a second example of the optical filter of the first embodiment.
Figure 3B:
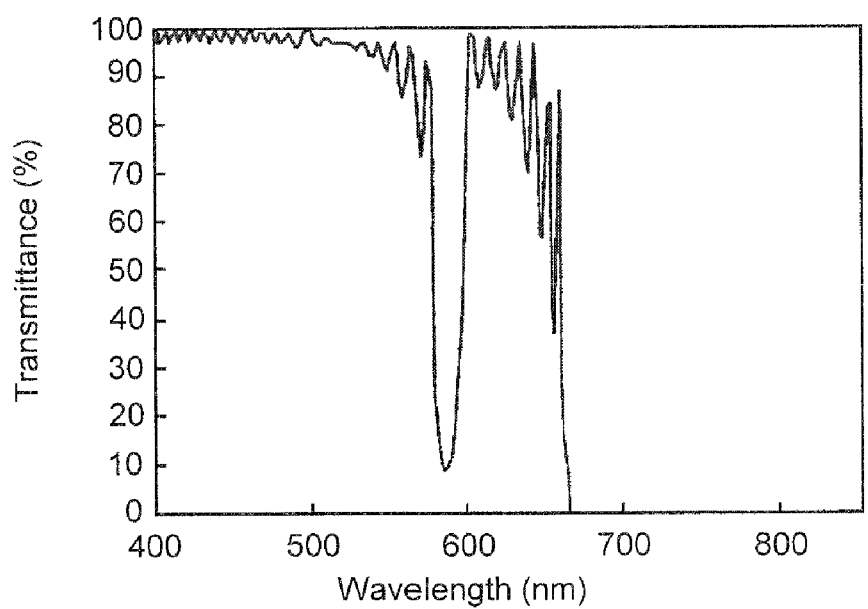
Figure 4A:
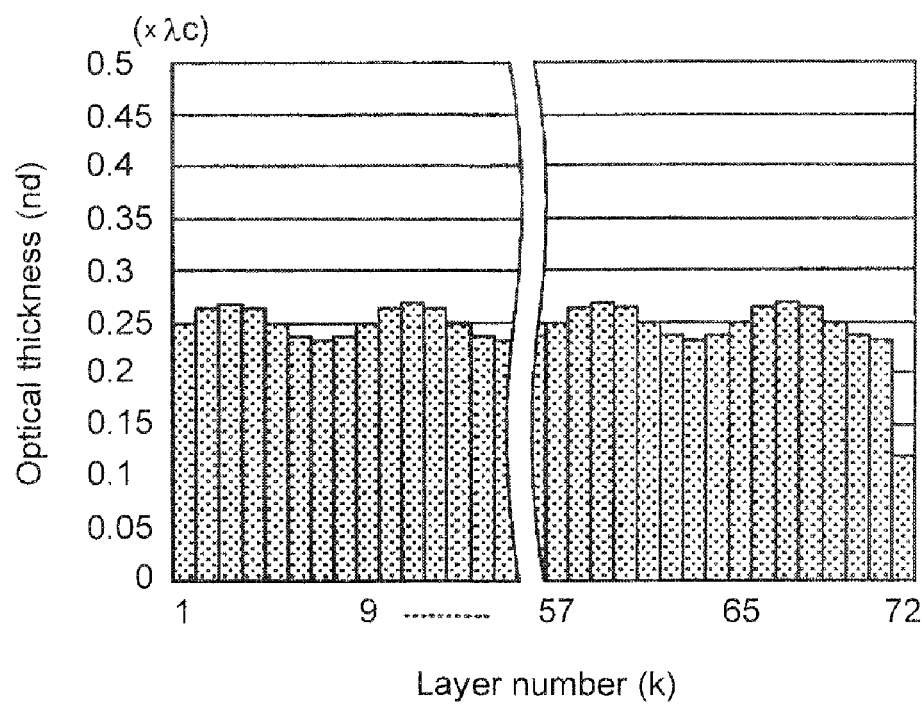
FIGS. 4A and 4B are graphic representations of an optical thickness distribution and a specked transmittance distribution, respectively, of a third example of the optical filter of the first embodiment.
Figure 4B:
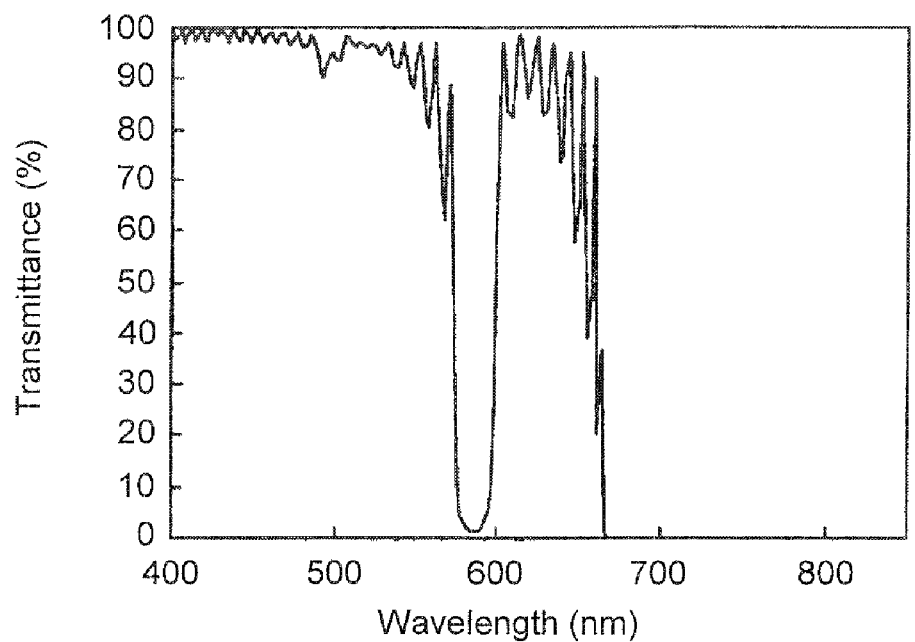
Figure 5A:
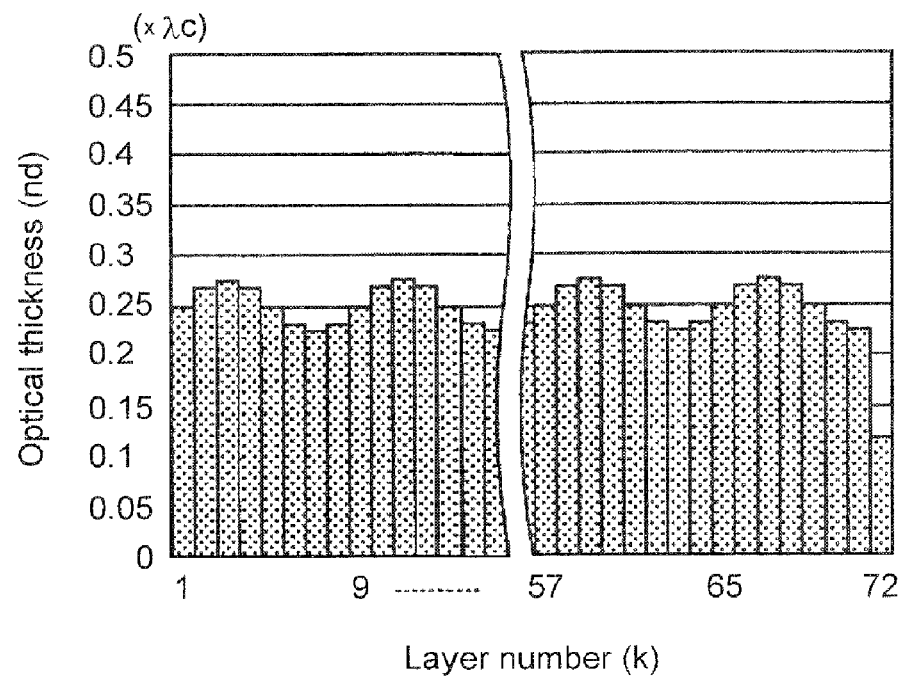
FIGS. 5A and 5B are graphic representations of an optical thickness distribution and a spectral transmittance distribution, respectively, of a fourth example of the optical filter of the first embodiment.
Figure 5B:
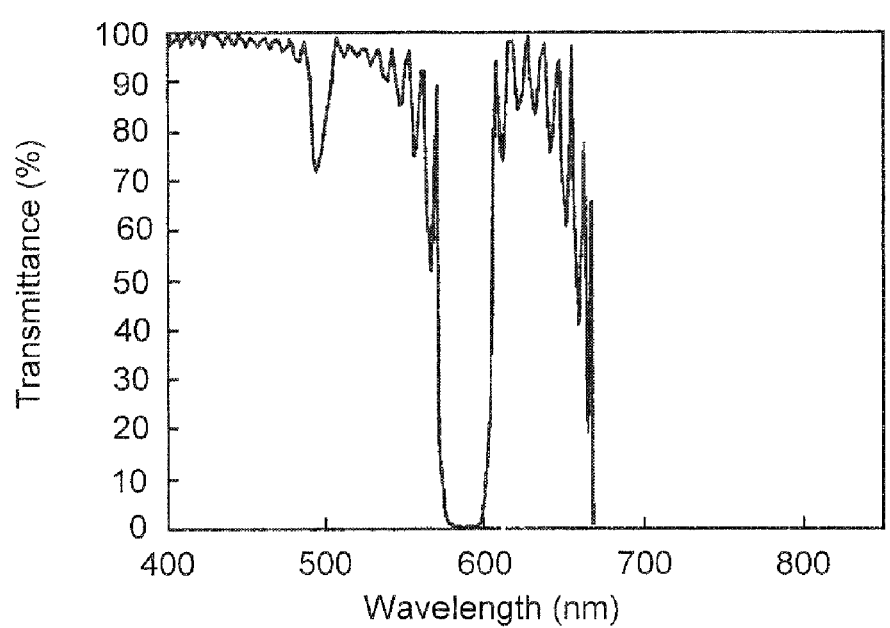
Figure 6A:
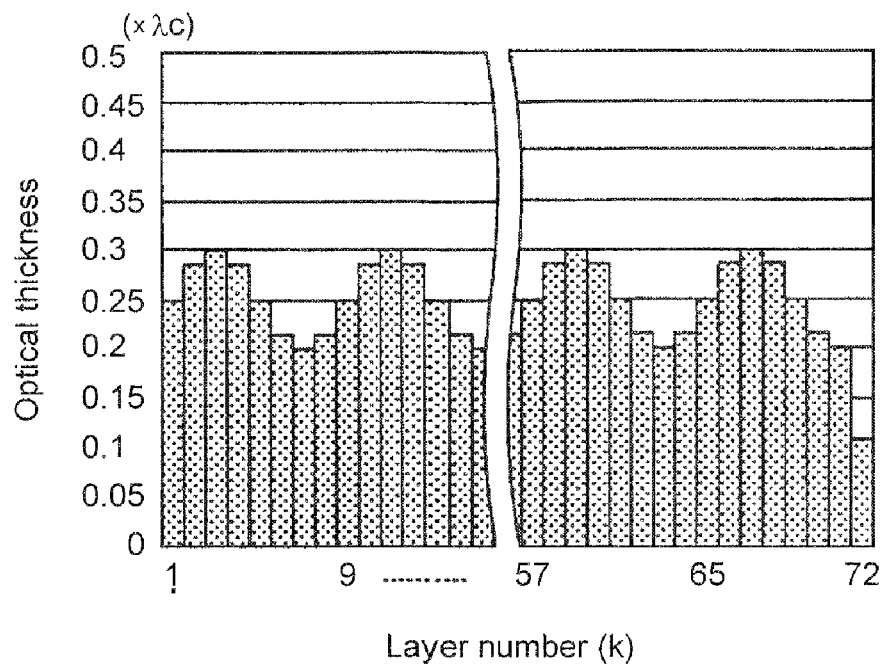
FIGS. 6A and 6B are graphic representations of an optical thickness distribution and a spectral transmittance distribution, respectively, of a fifth example of the optical filter of the first embodiment.
Figure 6B:
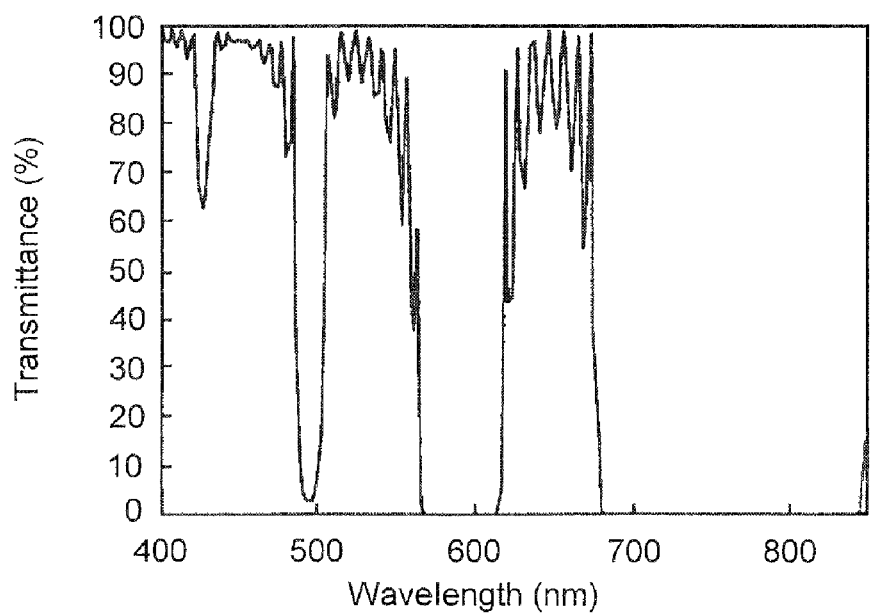
Figure 7A:
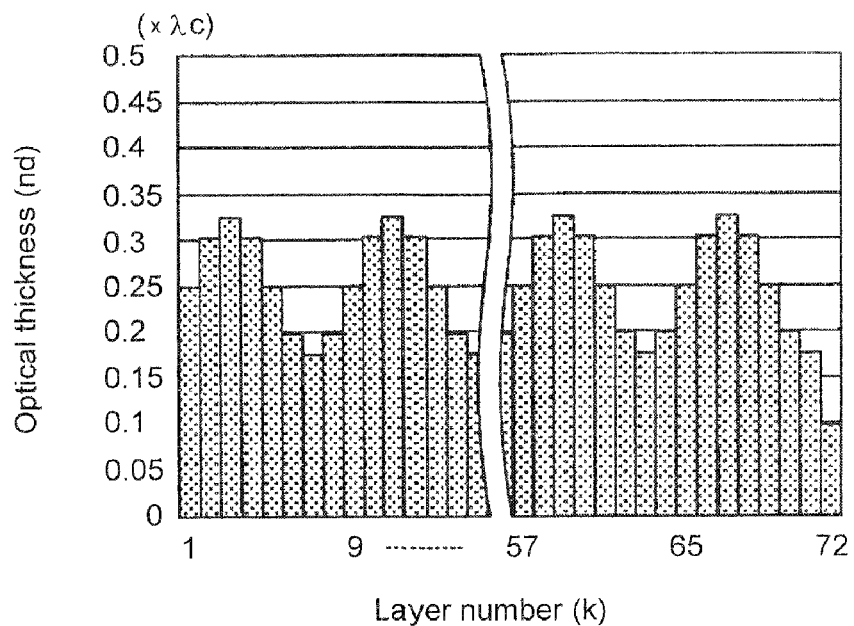
FIGS. 7A and 7B are graphic representations of an optical thickness distribution and a spectral transmittance distribution, respectively, of a sixth example of the optical filter of the first embodiment.
Figure 7B:
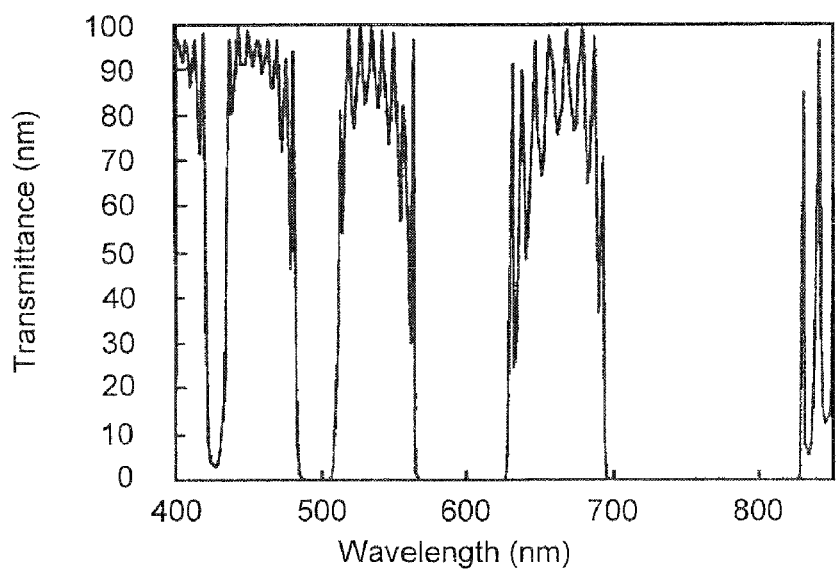
Figure 15:
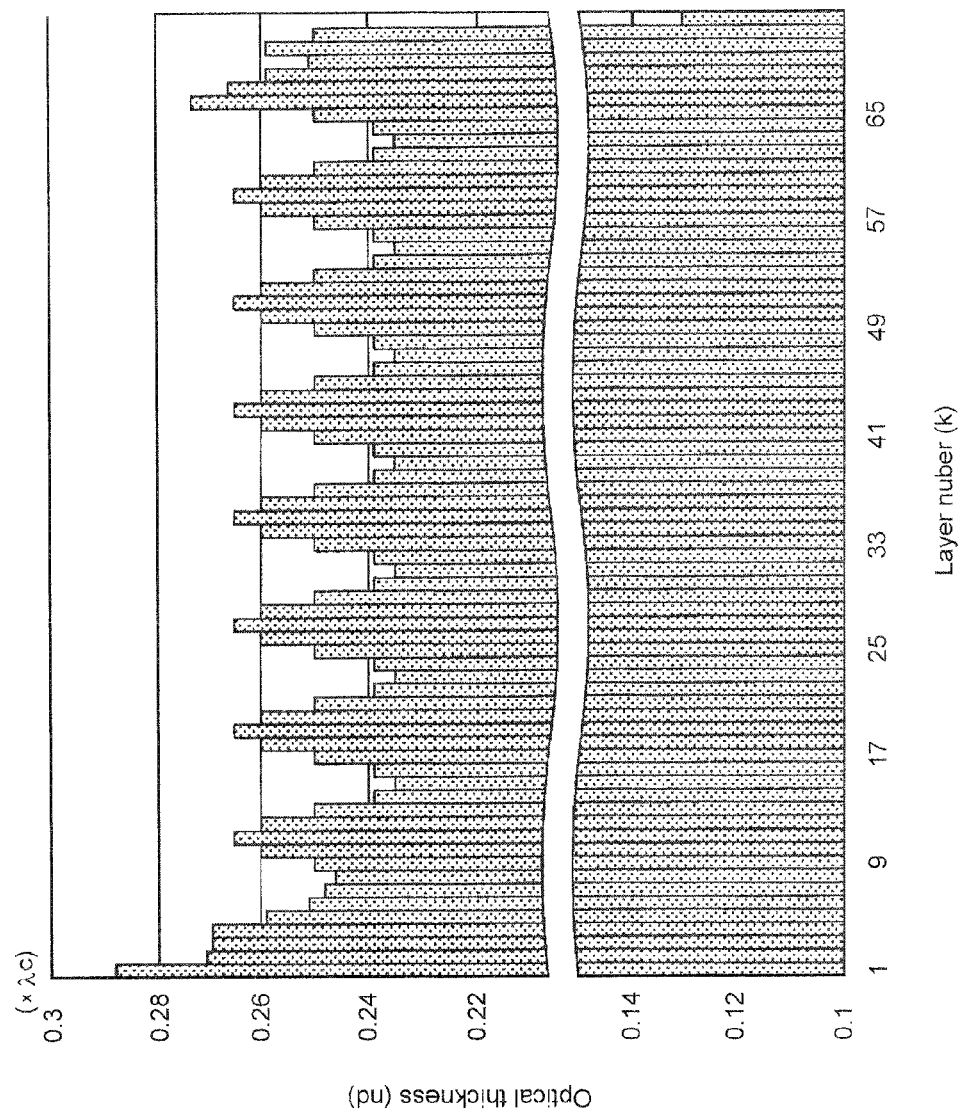
FIG. 15 is a graphic representation of an optical thickness distribution of the optical filter of a second example of a fifth embodiment.
Figure 16:
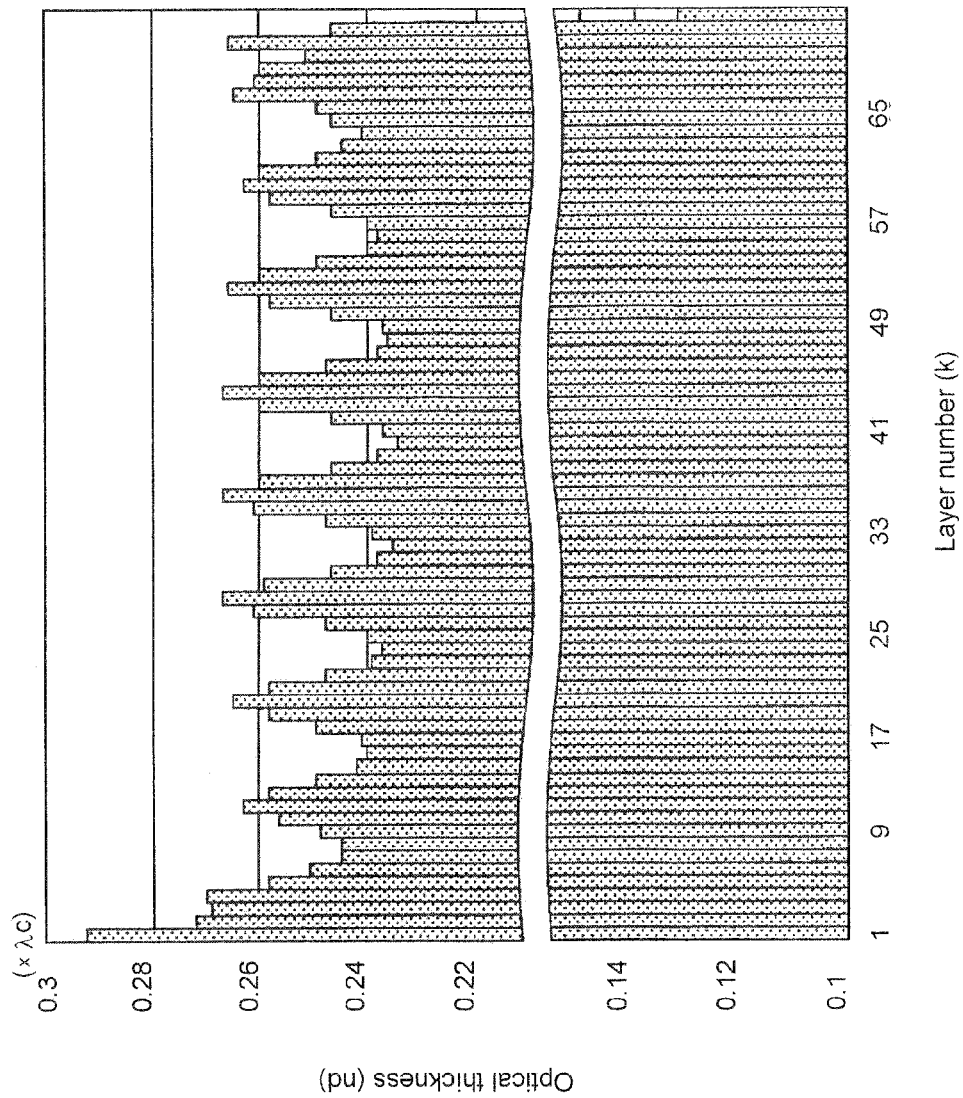
FIG. 16 is a graphic representation of an optical thickness distribution of the optical filter of a third example of the fifth embodiment.

Three optical filters PEV-1 to PEV-3 were prepared as practical examples of the fifth embodiment. The respective practical optical filters PEV-1 to PEV-3 had the same specific numerical data as the second practical optical filter PEI-2 of the first embodiment, except that the respective practical optical filters PEV-1 to PEV-3 had reflection bands centered at a wavelength of 770 nm. However, compensatory adjustment in optical thickness was made to layers of the practical optical filters PEV-2 and PEV-3. More specifically, with regard to the practical optical filter PEV-2, the compensatory adjustment of optical thickness was carried out on individual layers of the layer-stack closest to the transparent substrate 100 and the outermost layer-stack as shown in FIG. 15. On the other hand, with regard to the practical optical filter PEV-3, the compensatory adjustment of optical thickness was carried out on individual layers of every layer-stack as shown in FIG. 16. The practical optical filter PEV-1 had the same distribution of optical thickness as shown in FIG. 3A. Investigation was conducted in order to assess the dependency of spectral transmittance on wavelength.

Figure 17:
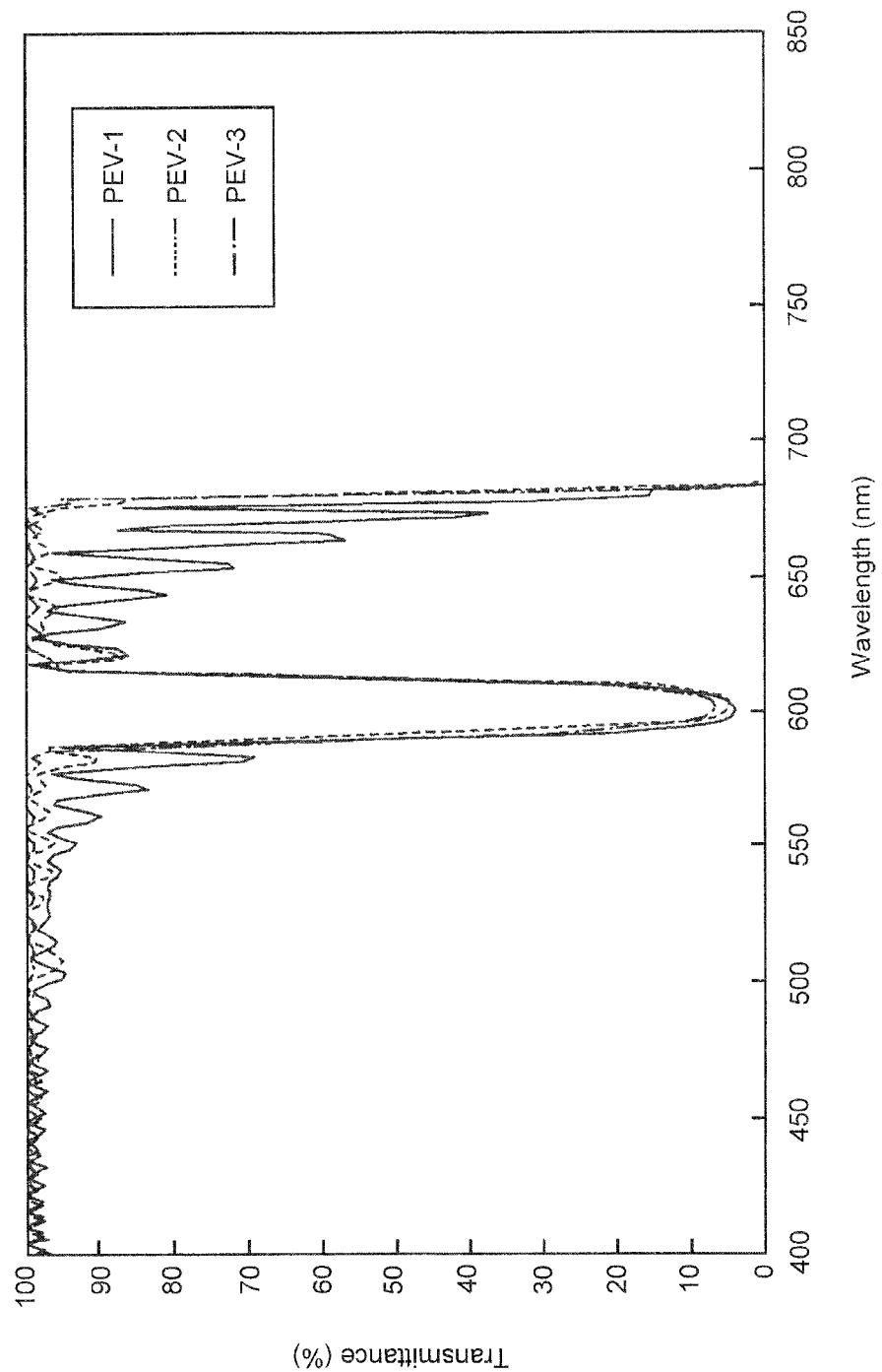
FIG. 17 is a graphic representation of spectral transmittance of the optical filters of the first, the second and the third examples of the fifth embodiment.

Referring to FIG. 17 representing spectral transmittance with respect to wavelength of the practical optical filters PEV-1 to PEV-3, lie practical optical filters PEV-2 and PEV-3 show minute fluctuations in spectral transmittance in a wavelength band less than a wavelength of approximately 670 nm, excluding a narrow wavelength band (reflection band) centered at a wavelength of approximately 600 nm, which are more uniform as compared with those of the practical optical filters PEV-1. However, there is no significant difference in reflection bandwidth and depth (amplitude of reflectance) among the three. In consequence, a conclusion is drawn from the investigation that the distribution of spectral transmittance can be finely controlled through compensatory adjustment in optical thickness.

Embodiment VI

Figure 18:
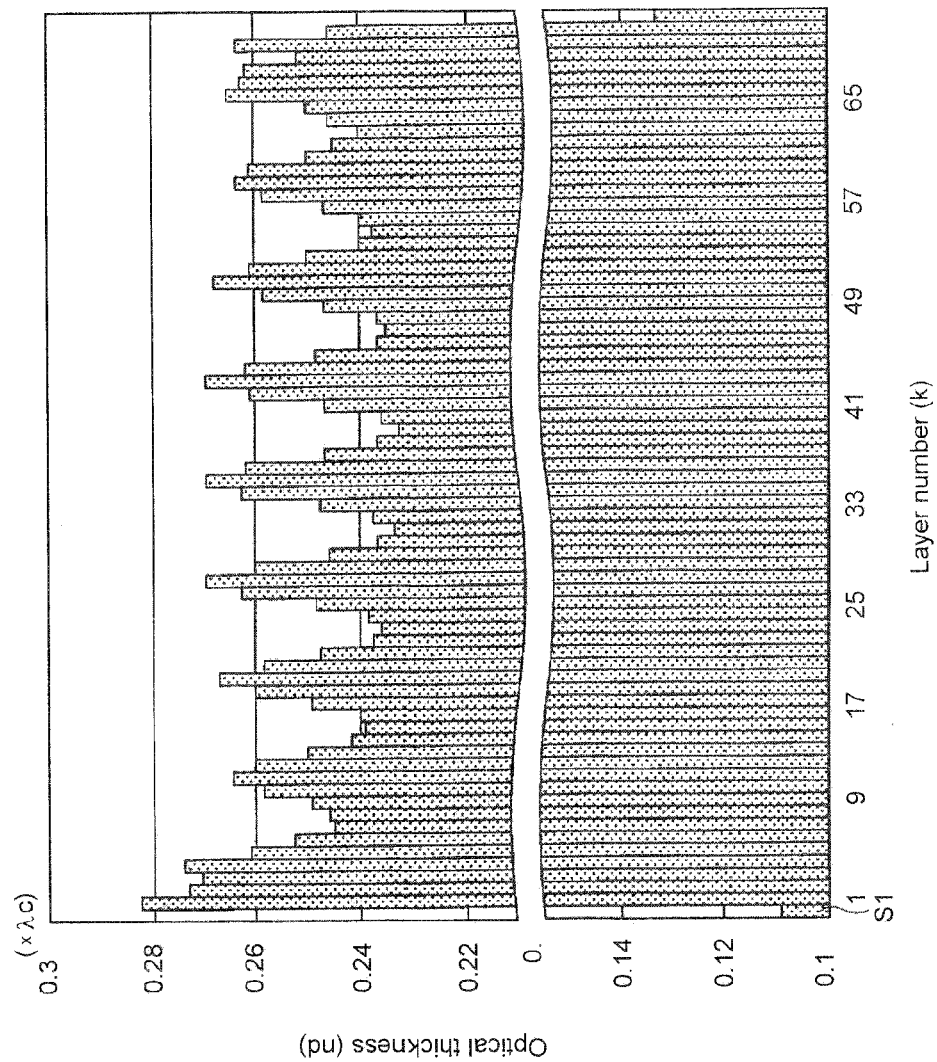
FIG. 18 is a graphic representation of an optical thickness distribution of the optical filter of a first example of a sixth embodiment.
Figure 19:
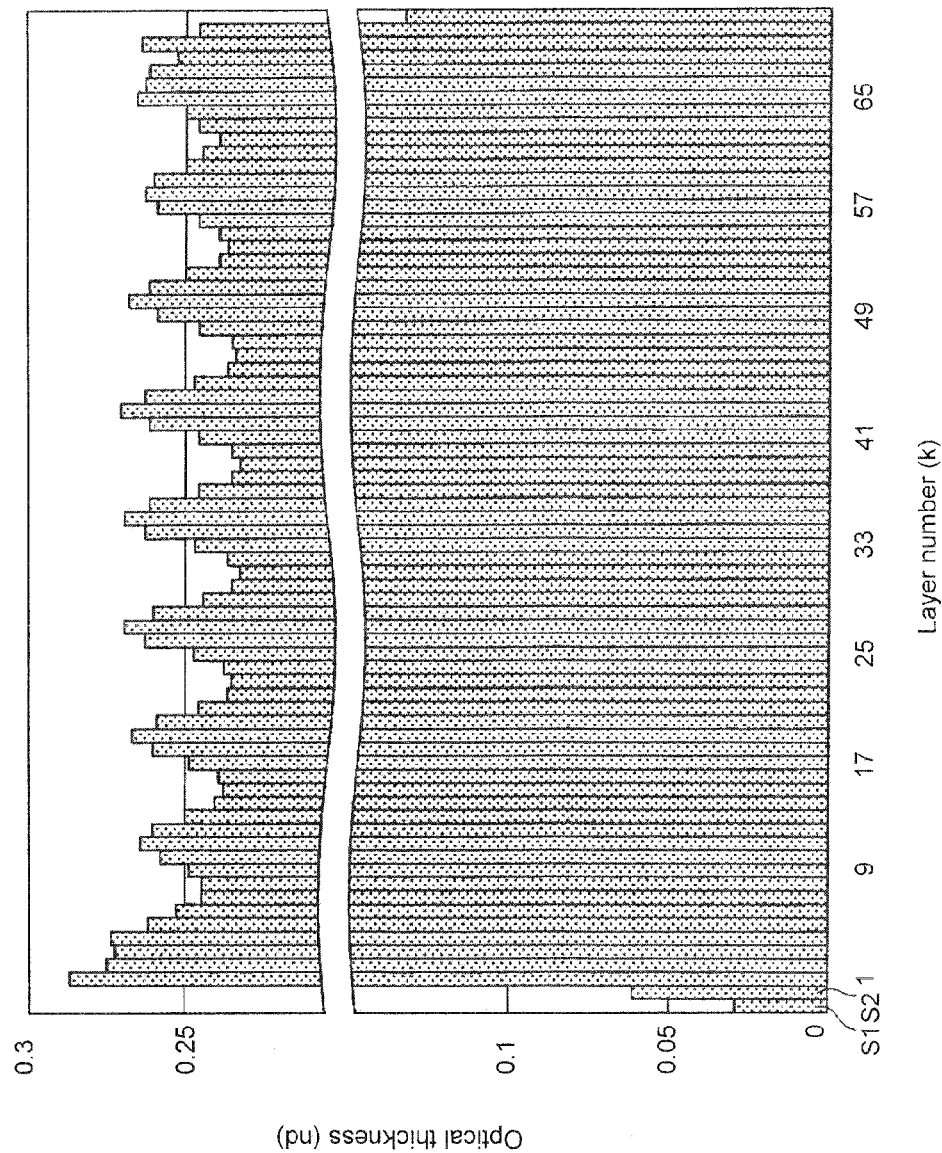
FIG. 19 is a graphic representation of an optical thickness distribution of the optical filter of a second example of the sixth embodiment.

Two optical filters PEVI-1 and PEVI-2 were prepared as practical examples of the sixth embodiment. The respective practical optical filters PEVI-1 and PEI-2 had the same specific numerical data as the practical optical filter PEV-3 of the previous embodiment except that the practical optical filters PEVI-1 and PEVI-2 had a base layer S1 provided between the transparent substrate 100 and the layer-stacks and individual layers subjected to compensatory adjustment in optical thickness as shown in FIGS. 18 and 19, respectively. More specifically, the practical optical filters PEVI-I was provided with a base layer S1 having a refractive index between indices of the high and the low refractive index layer. Precisely, Substance M1 (Merck A. G.: Germany) having a refractive index n.1 was used for the base layer S1. On the other hand, the practical optical filters PEVI-2 was provided with two base layers S1 and S2 which are expected to work as a monolayer having a resultant refractive index between indices of the high and the low refractive index layer. Precisely, a tantalum oxide ($Ta_2O_5$) which is a material for a high reeve index layer and a silicon dioxide ($SiO_2$) which is a material for a low refractive index layer were used for the two base layers S1 and S2, respectively. Investigation was conducted in order to assess the dependency of spectral transmittance on wavelength.

Figure 20:
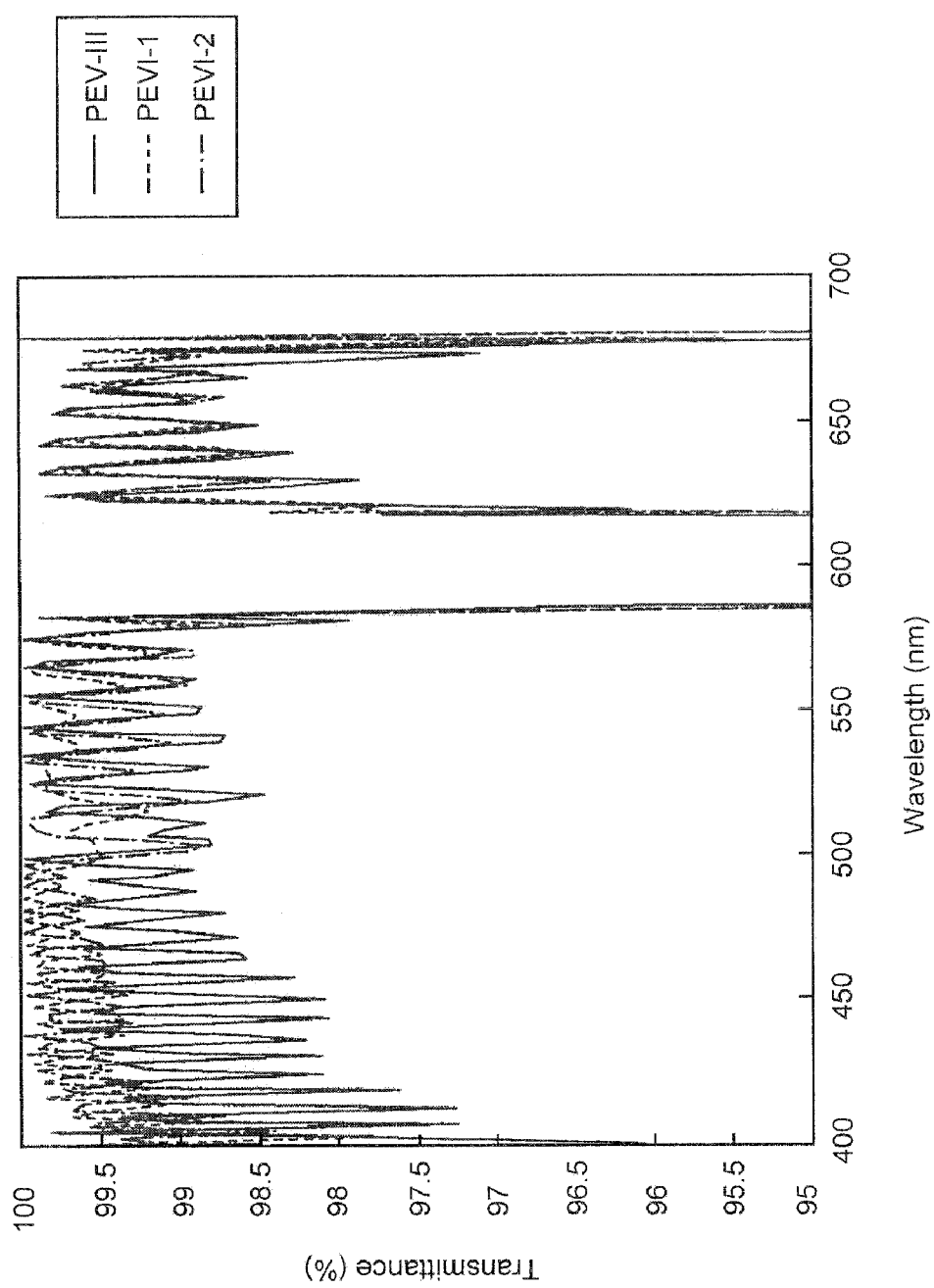
FIG. 20 is a graphic representation of spectral transmittance distributions of the optical filters of the first and the second example of the sixth embodiment as well as the first example of the fifth embodiment.

Referring to FIG. 20 representing spectral transmittance with respect to wavelength of the practical optical filters PEVI-1 and PEVI-2 as well as the practical optical filters PEV-1 of the previous embodiment, the practical optical filters PEVI-2 and PEVI-3 show relatively small fluctuations in spectral transmittance in a wavelength band at a shorter wavelength side of approximately 600 nm which are more uniform as compared with those of the practical optical filters PEV-3. However, there is no significant difference in reflection band width and depth (amplitude of reflectance) among the thee. In consequence, it is proved that the distribution of spectral transmittance can be optimized by a base layer having a refractive index between indices of the high and the low refractive index layer which is provided between the transparent substrate 100 and the multilayer thin film 10.

In the preferred embodiments described above, refractive indices and optical thickness of the transparent base board and the individual layers are not limited to specific values demonstrated in the accompanying drawings but may have any suitable values. In addition, materials used for the transparent base board and the individual layers are not limited to those taken for example in the preferred embodiments but may replaced with other materials. The individual layer may be formed by multiple layers according to the equivalent tin film theory. That is, the layer may be formed of two different refractive layers symmetrically stacked so as to as optically act like a monolayer.

As just described above, a reflection band on a shorter wavelength side of the infrared region, its desired bandwidth and its depth (amplitude of reflectance) of the optical filter are adjusted as desired by varying parameters, such as the late of amplitude, the pitch angle and the number of layer-stack (the total number of layers), in combination. Furthermore, a spectral transmittance distribution of the optical filter is provided as further desired by the compensatory adjustment of optical thickness of individual layers. It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An optical filter having a multilayer thin film comprising a plurality of layers which are stacked in alternate layers of high and low refractive indices on a transparent substrate, said layers of high refractive index and said layers of low refractive index cyclically change in optical thicknesses, respectively, throughout said multilayer thin film in a stacking direction wherein each of k-th from-the-bottom alternate layers of high and low refractive indices has an optical thickness (n×d) meeting the following conditional expressions (1) and (2), concurrently:

$$n \times d = (.c/4) \times [1 + \sin\{(k-1) \times .\} \times .] \quad (1)$$

$$0 \ldots < 1 \quad (2)$$

where
.c is the center wavelength of reflection band,
n is the refraction index of the layer for the d-line,
d is the physical thickness of the layer,
. is a factor of a pitch angle represented by 2./the number of layers for one layer-stack,
. is the rate of amplitude.

2. The optical filter as defined in claim 1, wherein said optical filter has a primary reflection band in an infrared region and a secondary reflection band on a shorter wavelength side of said infrared region.

3. The optical filter as defined in claim 2, wherein said secondary reflection band has a half-bandwidth of less than 50 nm.

4. The optical filter as defined in claim 1, wherein said optical filter has a reflection band in each of a wavelength band between 550 nm and 620 and a wavelength band upwards of 670 nm.

5. The optical filter as defined in claim 1, and further comprising a base layer which is formed between said alternate layers of high and low refractive indices and said transparent substrate and has a refractive index between said high refractive index and said low refractive index.

6. An optical filter having a multilayer thin film comprising a plurality of layers which are stacked in alternate layers of high and low refractive indices on a transparent substrate, said layers of high refractive index and said layers of low refractive index cyclically change in optical thicknesses, respectively, throughout said multilayer thin film in a stacking direction, wherein every odd-numbered layer has an optical thickness (n×d) meeting the following conditional expressions (3) to (5), concurrently, and every even-numbered layer has an optical thickness (n×d) meeting the following conditional expressions (5) and (6), concurrently:

$$n \times d = \beta \times (.c/4) \times [1+\sin\{((2m-1)-1\times.\}\times.] \quad (3)$$

$$\beta < 1 \quad (4)$$

$$0 \ldots < 1 \quad (5)$$

$$n \times d = (.c/4) \times [1+\sin\{(2m-1)\times.\}\times.] \quad (6)$$

where
m is a natural number
.c is the center wavelength,
n is the refraction index of the layer for the center wavelength .c,
d is the physical thickness of the layer,
. is the pitch angle represented by 2.n/ the number of layers of one layer-stack,
. is the rate of amplitude,
β is the ratio of optical thickness which is a fixed positive value defining a ratio of a mean optical thickness of the odd-numbered layers relative to a mean optical thickness of the even-numbered layers.

7. The optical filter as defined in claim 6, wherein said optical filter has a primary reflection band in an infrared region and a secondary reflection band on a shorter wavelength side of said infrared region.

8. The optical filter as defined in claim 7, wherein said secondary reflection band has a half-bandwidth of less than 50 nm.

9. The optical filter as defined in claim 6, wherein said optical filter has a reflection band in each of a wavelength band between 550 nm and 620 and a wavelength band upwards of 670 nm.

* * * * *